United States Patent [19]

Wang et al.

[11] Patent Number: 5,203,488
[45] Date of Patent: Apr. 20, 1993

[54] METHOD FOR JOINING CERAMIC COMPOSITE BODIES AND ARTICLES FORMED THEREBY

[75] Inventors: James C. Wang; Terry D. Claar, both of Newark, Del.

[73] Assignee: Lanxide Technology Company, LP, Newark, Del.

[21] Appl. No.: 803,702

[22] Filed: Dec. 4, 1991

Related U.S. Application Data

[63] Continuation of Ser. No. 589,634, Sep. 28, 1990, abandoned, which is a continuation-in-part of Ser. No. 551,749, Jul. 12, 1990, abandoned.

[51] Int. Cl.$^5$ .................... B22D 19/14; B23K 31/00
[52] U.S. Cl. .................... 228/122; 228/198; 164/97; 164/98
[58] Field of Search .............. 228/176, 193, 198, 203, 228/208, 263.12, 120–122, 124; 164/97, 98

[56] References Cited

U.S. PATENT DOCUMENTS

| | | | |
|---|---|---|---|
| 3,758,662 | 9/1973 | Tobin et al. | 264/332 |
| 3,864,154 | 2/1975 | Gazza et al. | 29/123 B |
| 4,055,451 | 10/1977 | Cockbain et al. | 228/228 |
| 4,353,714 | 10/1982 | Lee et al. | 51/295 |
| 4,471,059 | 9/1984 | Yoshino et al. | 501/96 |
| 4,492,670 | 1/1985 | Mizrah et al. | 419/9 |
| 4,544,524 | 10/1985 | Mizrah et al. | 419/9 |
| 4,585,618 | 4/1986 | Fresnel et al. | 419/12 |
| 4,595,545 | 6/1986 | Sane | 264/65 |
| 4,605,440 | 8/1986 | Halverson et al. | 75/238 |
| 4,692,418 | 9/1987 | Boecker et al. | 501/90 |
| 4,718,941 | 1/1988 | Halverson et al. | 75/236 |
| 4,777,014 | 10/1988 | Newkirk et al. | 419/12 |
| 4,793,968 | 12/1988 | Mosser et al. | 428/550 |
| 4,824,008 | 4/1989 | Luszcz et al. | 228/121 |
| 4,834,938 | 5/1989 | Pyzik et al. | 228/263.12 |
| 4,875,616 | 10/1989 | Nixdorf | 228/176 |
| 4,884,737 | 12/1989 | Newkirk et al. | 228/121 |
| 4,885,130 | 12/1989 | Claar et al. | 228/122 |
| 4,885,131 | 12/1989 | Newkirk | 419/12 |
| 4,891,338 | 1/1990 | Gesing et al. | 501/87 |
| 4,904,446 | 2/1990 | White et al. | 419/12 |
| 4,940,679 | 7/1990 | Claar et al. | 501/96 |
| 4,960,736 | 10/1990 | Luszcz et al. | 501/127 |
| 4,978,644 | 12/1990 | White et al. | 501/96 |
| 5,004,034 | 4/1991 | Park et al. | 164/97 |
| 5,010,044 | 4/1991 | Newkirk | 501/93 |
| 5,017,334 | 5/1991 | Claar et al. | 419/12 |
| 5,019,539 | 5/1991 | Claar et al. | 501/87 |
| 5,702,770 | 10/1987 | Pyzik et al. | 75/236 |

FOREIGN PATENT DOCUMENTS 0165707 12/1985 European Pat. Off. .
1492477 11/1977 United Kingdom .

Primary Examiner—Samuel M. Heinrich
Attorney, Agent, or Firm—Mark G. Mortenson; Carol A. Lewis

[57] ABSTRACT

This invention relates generally to a novel method for joining at least one first self-supporting body, to at least one second self-supporting body which is similar in composition to or different in composition from said at least one first self-supporting body and to novel products which result from such joining. In some of its more specific aspects, this invention relates to different techniques for joining ceramic matrix composite bodies to other ceramic matrix composite bodies of similar characteristics and for joining ceramic matrix composite bodies to bodies which have different characteristics (e.g., metals). The ceramic matrix composite bodies of this invention are produced by a reactive infiltration of a molten parent metal into a bed or mass containing a boron source material and a carbon source material (e.g., boron carbide) and/or a boron source material and a nitrogen source material (e.g., boron nitride) and, optionally, one or more inert fillers.

17 Claims, 13 Drawing Sheets

METHOD FOR JOINING CERAMIC COMPOSITE BODIES AND ARTICLES FORMED THEREBY

CROSS-REFERENCE TO RELATED APPLICATION

This is a continuation of copending application Ser. No. 07/589,634 filed on Sep. 28, 1990, now abandoned, which is a continuation-in-part of application Ser. No. 07/551,749, now abandoned. The disclosure of the above-identified patent application is hereby expressly incorporated by reference.

FIELD OF THE INVENTION

This invention relates generally to a novel method for joining at least one first self-supporting body, to at least one second self-supporting body which is similar in composition to or different in composition from said at least one first self-supporting body and to novel products which result from such joining. In some of its more specific aspects, this invention relates to different techniques for joining ceramic matrix composite bodies to other ceramic matrix composite bodies of similar characteristics and for joining ceramic matrix composite bodies to bodies which have different characteristics (e.g., metals). The ceramic matrix composite bodies of this invention are produced by a reactive infiltration of a molten parent metal into a bed or mass containing a boron source material and a carbon source material (e.g., boron carbide) and/or a boron source material and/or a nitrogen source material (e.g., boron nitride) and, optionally, one or more inert fillers.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al, B-Al; $B_4$C-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4$C-Al composites, a $B_4$C-Al compact (formed by cold pressing a homogeneous mixture of $B_4$C and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENTS AND PATENT APPLICATIONS

Many of the above-discussed problems associated with the production of boride-containing materials have been addressed in U.S. Pat. No. 4,885,130 (hereinafter "U.S. Pat. No. '130"), which issued on Dec. 5, 1989, in the names of Terry Dennis Claar et al., and is entitled "A Process for Preparing Self-Supporting Bodies and Products Produced Thereby".

Briefly summarizing the disclosure of U.S. Pat. No. '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of U.S. Pat. No. '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in U.S. Pat. No. '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which is utilized in U.S. Pat. No. '30 is one which is relatively inert or unreactive under the process conditions. Particularly, it is disclosed that an argon gas, or a vacuum, for example, would be suitable process atmospheres. Still further, it is disclosed that when zirconium is used as the parent metal, the resulting composite comprises zirconium diboride, zirconium carbide, and residual zirconium metal. It is also disclosed that when aluminum parent metal is used with the process, the result is an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which are disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related Patent, specifically, U.S. Pat. No. 4,915,736 (hereinafter referred to as "U.S. Pat. No. '736"), issued in the names of Terry Dennis Claar and Gerhard Hans Schiroky, on Apr. 10, 1990, and entitled "A Method of Modifying Ceramic Composite Bodies By a Carburization Process and Articles Produced Thereby", additional modification techniques are disclosed. Specifically, U.S. Pat. No. '736 discloses that a ceramic composite body made in accordance with the teachings of, for example, U.S. Pat. No. '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, U.S. Pat. No. '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

U.S. Pat. No. 4,885,131 (hereinafter "U.S. Pat. No. '131"), issued in the name of Marc S. Newkirk on Dec. 5, 1989, and entitled "Process For Preparing Self-Supporting Bodies and Products Produced Thereby", discloses additional reactive infiltration formation techniques. Specifically, U.S. Pat. No. '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, varying ratios of one ceramic or another and porosity.

In another related patent application, specifically, copending U.S. patent application Ser. No. 07/296,770 (hereinafter referred to as "application Ser. No. '770"), filed in the names of Terry Dennis Claar et al., on Jan. 13, 1989, and entitled "A Method of Producing Ceramic Composite Bodies", additional reactive infiltration formation techniques are disclosed. Specifically, application Ser. No. '770 discloses various techniques for shaping a bed or mass comprising boron carbide into a predetermined shape and thereafter reactively infiltrating the bed or mass comprising boron carbide to form a self-supporting body of a desired size and shape.

U.S. Pat. No. 5,011,063, which issued on Apr. 30, 1991, from U.S. patent application Ser. No. 07/560,491 (hereinafter referred to as "application Ser No. '491"), filed Jul. 23, 1990, which is a continuation application of U.S. patent application Ser. No. 07/296,837, filed in the name of Terry Dennis Claar on Jan. 13, 1989, and both entitled "A Method of Bonding A Ceramic Composite Body to a Second Body and Articles Produced Thereby", discloses various bonding techniques for bonding self-supporting bodies to second materials. Particularly, this patent application discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in U.S. Pat. No. 4,904,446 (hereinafter "U.S. Pat. No. '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

A further post-treatment process for modifying the properties of produced ceramic composite bodies is disclosed in U.S. Pat. No. 5,004,714, which issued on Apr. 2, 1991, from U.S. patent application Ser. No. 07/296,966 (hereinafter "application Ser No. '966"), filed in the names of Terry Dennis Claar et al., on Jan. 13, 1989, and entitled "A Method of Modifying Ceramic Composite Bodies By A Post-Treatment Process and Articles Produced Thereby". Specifically, application Ser. No. '966 discloses that self-supporting bodies produced by a reactive infiltration technique can be post-treated by exposing the formed bodies to one or more metals and heating the exposed bodies to modify at least one property of the previously formed composite body. One specific example of a post-treatment modification step includes exposing a formed body to a siliconizing environment.

Copending U.S. Pat. No. 5,019,539, which issued on May 28, 1991, from U.S. patent application Ser. No. 07/296,961 (hereinafter application Ser. No. '961"), filed in the names of Terry Dennis Claar et al., on January 13, 1989, and entitled "A Process for Preparing Self-Supporting Bodies Having Controlled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

In accordance with a first step of the present invention, self-supporting ceramic bodies are produced by utilizing a parent metal infiltration and reaction process (i.e. reactive infiltration) in the presence of a bed or mass comprising, for example, boron carbide or boron nitride. Such bed or mass is infiltrated by molten parent metal, and the bed may be comprised entirely of boron carbide, boron nitride, and/or mixtures of boron donor materials, carbon donor materials and/or nitrogen donor materials. Depending on the particular reactants involved in the reactive infiltration, the resulting bodies which are produced comprise one or more reaction products of parent metal boron-containing compounds, and/or one or more parent metal carbon-containing compounds and/or one or more parent metal nitrogen-containing compounds, etc. Alternatively, the mass to be infiltrated may contain one or more inert fillers admixed therewith to produce a composite by reactive infiltration, which composite comprises a matrix of one or more of the aforementioned reaction products and also may include residual unreacted or unoxidized constituents of the parent metal. The filler material may be embedded by the formed matrix. The final product may include a metal as one or more metallic constituents of the parent metal. Still further, in some cases it may be desirable to add a carbon donor material (i.e., a carbon-containing compound) and/or a boron donor material (i.e., a boron-containing compound) and/or a nitrogen-donor material (i.e., a nitrogen-containing compound) to the bed or mass which is to be infiltrated to modify, for example, the relative amounts of one formed reaction product to another, thereby modifying resultant mechanical properties of the composite body. Still further, the reactant concentrations and process conditions may be altered or controlled to yield a body containing varying volume percents of ceramic compounds, metal and/or porosity.

Broadly, in accordance with the first step of the method according to this invention, the bed or mass which is to be reactively infiltrated may be placed adjacent to or contacted with a body of molten metal or metal alloy, which is melted in a substantially inert environment within a particular temperature envelope. The molten metal infiltrates the mass and reacts with at least one constituent of the bed or mass to be infiltrated to form one or more reaction products. At least a portion of the formed reaction product is maintained in contact with the metal, and molten metal is drawn or transported toward the remaining unreacted mass by a wicking or capillary action. This transported metal forms additional reaction product upon contact with the remaining unreacted mass, and the formation or development of a ceramic body is continued until the parent metal or remaining unreacted mass has been consumed, or until the reaction temperature is altered to be outside the reaction temperature envelope. The resulting structure comprises, depending upon the particular materials comprising the bed or mass which is to be reactively infiltrated, one or more of a parent metal boride, a parent metal boro compound, a parent metal carbide, a parent metal nitride, a metal (which as used herein is intended to include alloys and intermetallics), or voids, or a combination thereof, and these several phases may or may not be interconnected in one or more dimensions. The final volume fractions of the reaction products and metallic phases, and the degree of interconnectivity, can be controlled by changing one or more conditions, such as the initial density of the mass to be reactively infiltrated, the relative amounts and chemical composition of the materials contained within the mass which is to be reactively infiltrated, the amount of parent metal provided for reaction, the composition of the parent metal, the presence and amount of one or more filler materials, temperature, time, etc.

Typically, the mass to be reactively infiltrated should be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another aspect of the first step of the invention, a composite is produced by the transport of molten parent metal into the bed or mass which is to be reactively infiltrated which has admixed therewith one or more inert filler materials. In this embodiment, one or more suitable filler materials are mixed with the bed or mass to be reactively infiltrated. The resulting self-supporting ceramic-metal composite that is produced typically comprises a dense microstructure which comprises a filler embedded by a matrix comprising at least one parent metal reaction product, and also may include a substantial quantity of metal. Typically, only a small amount of material (e.g., a small amount of boron carbide) is required to promote the reactive infiltration process. Thus, the resulting matrix can vary in content from one composed primarily of metallic constituents thereby exhibiting certain properties characteristic of the parent metal; to cases where a high concentration of reaction product is formed, which dominates the properties of the matrix. The filler may serve to enhance the properties of the composite, lower the raw materials cost of the composite, or moderate the kinetics of the reaction product formation reactions and the associated rate of heat evolution. The precise starting amounts and composition of materials utilized in the reactive infiltration process can be selected so as to result in a desirable body which is compatible with the second step of the invention.

In another aspect of the first step of the present invention, the material to be reactively infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can at least partially, or substantially completely, surround the preform. The use of a graphite material (e.g., a graphite mold, a graphite tape product, a graphite coating, etc.) is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the first step of the present invention, can be reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

Still further, the procedures discussed above herein in the Section "Discussion of Related Patents and Patent Applications" may be applicable in connection with the first step of the present invention.

Once a self-supporting body has been formed in accordance with the first step of the present invention, then the second step of the present invention is put into effect. The second step of the present invention involves a plurality of different embodiments, each of which is discussed below.

In a first embodiment of the second step of the present invention, at least one first self-supporting body formed in accordance with the first step of the invention is contacted with at least one second self-supporting body formed in accordance with the first step of the invention, said contacting occurring with or without the application of external pressure upon the contacted bodies. The contacted bodies are then held together in an appropriate manner (e.g., by the force of gravity, by some external pressure means, etc.) and are heated to an elevated temperature to permit the bodies to bond together. Stated more specifically, when at least two bodies made in accordance with the first step of the present invention are contacted with each other and are heated to a temperature which is above the melting point of at least a portion of the metallic constituent in at least one of the bodies and the contacted bodies are held at such temperature for an appropriate amount of time and in the presence of, for example, a substantially inert atmosphere (e.g., an atmosphere similar to the formation atmosphere utilized in the first step of the present invention), said contacted bodies can bond together through at least a portion of the area of mutual contact and form a well bonded unitary piece. The conditions utilized to achieve the bond between said at least two contacted bodies can be tailored so that the original joining area between said at least two bodies is substantially completely indistinguishable from any other area in said at least two bodies. For example, if the temperature utilized to join the bodies is a temperature only slightly above the melting point of at least a portion of the metallic constituent in at least one of the bodies, the time required for joining may be longer than the time required for joining when the temperature is significantly above the melting point of substantially all of the metallic constituent in both of the bodies.

The ability to join said at least two bodies together is a significant achievement because rather than forming a very complex-shaped preform of a bed or mass which is to be reactively infiltrated or a complex-shaped mold to contain a bed or mass of filler material which is to be reactively infiltrated, a plurality of simpler or less complex shaped preforms (or molds containing filler material) can be utilized to form self-supporting bodies in accordance with the first step of the invention. Such formed bodies can thereafter be bonded together to form a intricate or complex-shaped piece or a very large piece. Due to the nature of the joining mechanism, it can be extremely difficult, if not impossible, to distinguish any joint area from any other area of the formed body. Accordingly, this invention permits the formation of intricate and complex shapes, as well as large bodies, by combining a plurality of relatively simple shapes made by relatively simple techniques.

In a second embodiment of the second step of the present invention, the plurality of individual bodies which are bonded together do not consist entirely of materials made in accordance with the first step of the present invention. For example, materials such as metals, ceramics, etc., can be bonded to articles made in accordance with the first step of the invention. In this second embodiment of the second step of the invention, in order for bonding to occur, it is desirable for some type of reaction to occur between a body produced in accordance with the first step of the invention and a second body.

A third embodiment of the second step of the present invention involves the placement of materials, similar to those utilized to form the self-supporting body of the first step of the present invention, between at least two bodies which are to be bonded together. Specifically, the joining area which exists between said at least two bodies which are to be bonded together can be filled with, for example, a powdered parent metal and a material which is to be reactively infiltrated. Alternatively, the joint can be filled with, for example, a material which is to be reactively infiltrated and a source of parent metal can be placed into contact with the material which is to be reactively infiltrated. Thus, a reaction is permitted to occur between the parent metal and the material which is to be reactively infiltrated so as to form a bonding zone at the joining area between the aforementioned at least two bodies.

In accordance with the third embodiment of the second step of the present invention, if the bodies to be joined are of similar composition (e.g., two bodies of the same composition formed in accordance with the first step of the present invention), then the processing conditions utilized to form the Joint can be tailored so that the joining area is substantially indistinguishable from other areas of the aforementioned bodies to be joined. However, if the bodies to be joined have a very different composition, then the joining area will be distinguishable. However, bodies can be substantially different in composition and can still be joined together by the technique. For example, a body produced in accordance with the first step of the present invention can be bonded to, for example, a metal.

In a fourth embodiment of the second step of the present invention, an active brazing material is placed between two bodies formed in accordance with the first step of the present invention or, alternatively, the brazing material may be placed between one body formed in accordance with the first step of the present invention and a second body. Particularly, for example, a foil, paste or powder which comprises an active brazing alloy (e.g., titanium) is placed between at least two self-supporting bodies made in accordance with the first step of the present invention. Without wishing to be bound by any particular theory or explanation, it appears as though the active brazing alloy assists in the wetting and bonding the materials together. To achieve bonding by use of an active brazing alloy, the contacted bodies, containing therebetween the active brazing alloy in any suitable form, are heated to a temperature which permits the active brazing alloy to bond the bodies together.

In each of the above-discussed embodiments of the second step of the present invention, it may be desirable to bond together bodies made in accordance with the first step of the invention. In this case, it is possible that bodies produced in accordance with the first step of the present invention may comprise completely different parent metals and thus completely different reaction products. Alternatively, the bodies produced may have been produced by using very similar parent metals and thus very similar reaction products result. Accordingly, the present invention permits bonding to occur between dissimilar materials due to the inherent nature of the bond which is formed. Thus, the present invention permits the formation of relatively complex shapes and/or relatively large shapes due to the ability to bond similar or dissimilar bodies together in a secure manner.

DEFINITIONS

As used in this specification and the appended claims, the terms below are defined as follows:

"Parent metal" refers to that metal, e.g. zirconium, which is the precursor for the polycrystalline oxidation reaction product, that is, the parent metal boride, parent metal nitride, or other parent metal compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise, by the context.

"Parent metal boride" and "parent metal boro compounds" mean a reaction product containing boron formed upon reaction between a boron source and the parent metal and includes a binary compound of boron with the parent metal as well as ternary or higher order compounds.

"Parent metal nitride" means a reaction product containing nitrogen formed upon reaction of a nitrogen source (e.g., boron nitride) and parent metal.

"Parent metal carbide" means a reaction product containing carbon formed upon reaction of a carbon source and parent metal.

DETAILED DESCRIPTION OF THE INVENTION AND PREFERRED EMBODIMENTS

Figure 1:
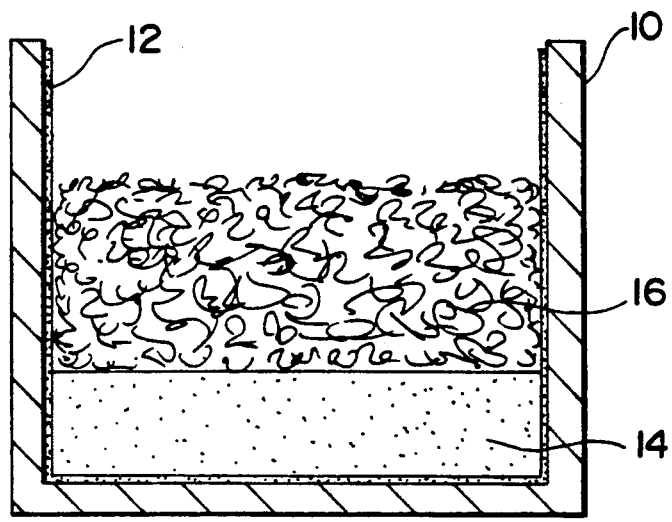
FIG. 1 is a schematic view of the setup used to fabricate a platelet reinforced composite body for joining to a steel substrate in accordance with Example 1.

The present invention permits one or more bodies to be bonded together to form desirable complex structures or shapes or relatively large structures or shapes without the requirement for any complex steps.

In accordance with a first step of the present invention, self-supporting ceramic bodies are produced by utilizing a parent metal (e.g., zirconium, titanium, and/or hafnium) infiltration and reaction process (i.e. reactive infiltration) in the presence of a bed or mass comprising, for example, boron carbide or boron nitride. Such bed or mass is infiltrated by molten parent metal, and the bed may be comprised entirely of boron carbide, boron nitride, and/or mixtures of boron donor materials and carbon donor materials and/or nitrogen donor materials. Depending on the particular reactants involved in the reactive infiltration, the resulting bodies which are produced comprise one or more reaction products of parent metal boron-containing compounds, and/or one or more parent metal carbon-containing compounds and/or one or more parent metal nitrogen-containing compounds, etc. Alternatively, the mass to be infiltrated may contain one or more inert fillers admixed therewith to produce a composite by reactive infiltration, which composite comprises a matrix of one or more of the aforementioned reaction products and also may include residual unreacted or unoxidized constituents of the parent metal. The filler material may be embedded by the formed matrix. The final product may include a metal as one or more metallic constituents of the parent metal. Still further, in some cases it may be desirable to add a carbon donor material (i.e., a carbon-containing compound) and/or a boron donor material (i.e., a boron-containing compound) to the bed or mass which is to be infiltrated to modify, for example, the relative amounts of one formed reaction product to another, thereby modifying resultant mechanical properties of the composite body. Still further, the reactant concentrations and process conditions may be altered or controlled to yield a body containing varying volume percents of ceramic compounds, metal and/or porosity.

Broadly, in accordance with the first step of the method according to this invention, the bed or mass which is to be reactively infiltrated may be placed adjacent to or contacted with a body of molten metal or metal alloy, which is melted in a substantially inert environment within a particular temperature envelope. The molten metal infiltrates the mass and reacts with at least one constituent of the bed or mass to be infiltrated to form one or more reaction products. At least a portion of the formed reaction product is maintained in contact with the metal, and molten metal is drawn or transported toward the remaining unreacted mass by a wicking or capillary action. This transported metal forms additional reaction product upon contact with the remaining unreacted mass, and the formation or development of a ceramic body is continued until the parent metal or remaining unreacted mass has been consumed, or until the reaction temperature is altered to be outside the reaction temperature envelope. The resulting structure comprises, depending upon the particular materials comprising the bed or mass which is to be reactively infiltrated, one or more of a parent metal boride, a parent metal boro compound, a parent metal carbide, a parent metal nitride, a metal (which as used herein is intended to include alloys and intermetallics), or voids, or a combination thereof, and these several phases may or may not be interconnected in one or more dimensions. The final volume fractions of the reaction products and metallic phases, and the degree of interconnectivity, can be controlled by changing one or more conditions, such as the initial density of the mass to be reactively infiltrated, the relative amounts and chemical composition of the materials contained within the mass which is to be reactively infiltrated, the amount of parent metal provided for reaction, the composition of the parent metal, the presence and amount of one or more filler materials, temperature, time, etc.

Typically, the mass to be reactively infiltrated should be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another aspect of the first step of the invention, a composite is produced by the transport of molten parent metal into the bed or mass which is to be reactively infiltrated which has admixed therewith one or more inert filler materials. In this embodiment, one or more suitable filler materials are mixed with the bed or mass to be reactively infiltrated. The resulting self-supporting ceramic-metal composite that is produced typically comprises a dense microstructure which comprises a filler embedded by a matrix comprising at least one parent metal reaction product, and also may include a substantial quantity of metal. Typically, only a small amount of material (e.g., a small amount of boron carbide) is required to promote the reactive infiltration process. Thus, the resulting matrix can vary in content from one composed primarily of metallic constituents thereby exhibiting certain properties characteristic of the parent metal; to cases where a high concentration of reaction product is formed, which dominates the properties of the matrix. The filler may serve to enhance the properties of the composite, lower the raw materials cost of the composite, or moderate the kinetics of the reaction product formation reactions and the associated rate of heat evolution. The precise starting amounts and composition of materials utilized in the reaction infiltration process can be selected so as to result in a desirable body which is compatible with the second step of the invention.

In another aspect of the first step of the present invention, the material to be reactively infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can at least partially, or substantially completely, surround the preform. The use of a graphite material (e.g., a graphite mold, a graphite tape product, a graphite coating, etc.) is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the first step of the present invention, can be reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

Still further, the procedures discussed above herein in the Section "Discussion of Related Patents and Patent Applications" may be applicable in connection with the first step of the present invention.

Once a self-supporting body has been formed in accordance with the first step of the present invention, then the second step of the present invention is put into effect. The second step of the present invention involves a plurality of different embodiments, each of which is discussed below.

In a first embodiment of the second step of the present invention, at least one first self-supporting body formed in accordance with the first step of the invention is contacted with at least one second self-supporting body formed in accordance with the first step of the invention, said contacting occurring with or without the application of external pressure upon the contacted bodies. The contacted bodies are then held together in an appropriate manner (e.g., by the force of gravity, by some external pressure means, etc.) and are heated to an elevated temperature to permit the bodies to bond together. Stated more specifically, when at least two bodies made in accordance with the first step of the present invention are contacted with each other and are heated to a temperature which is above the melting point of at least a portion of the metallic constituent in at least one of the bodies and the contacted bodies are held at such temperature for an appropriate amount of time and in the presence of, for example, a substantially inert atmosphere (e.g., an atmosphere similar to the formation atmosphere utilized in the first step of the present invention), said contacted bodies can bond together through at least a portion of the area of mutual contact and form a well bonded unitary piece. The conditions utilized to achieve the bond between said at least two contacted bodies can be tailored so that the original joining area between said at least two bodies is substantially completely indistinguishable from any other area in said at least two bodies. For example, if the temperature utilized to join the bodies is a temperature only slightly above the melting point of at least a portion of the metallic constituent in at least one of the bodies, the time required for joining may be longer than the time required for joining when the temperature is significantly above the melting point of substantially all of the metallic constituent in both of the bodies.

The choice of particular temperature, atmosphere and time are dependent upon the type of bodies which are to be bonded together as well as the type of bond which is desired to be formed. For example, if the bodies to be bonded together comprise substantially the same materials and it is desired that the bond or joining area be substantially indistinguishable from any other part of the bodies to be bonded together, then a sufficiently high temperature and sufficiently long duration of time needs to be chosen so as to permit bonding to occur. Without wishing to be bound by any particular theory or explanation, it is possible that when the bodies are at a temperature above the melting point of at least a portion of the metallic constituent of at least one of the bodies, then a reaction product of similar composition and size can be formed between the bodies which are bonded together. However, if either or both of the temperature or time is decreased, the tendency for the joining area to be distinguishable from other portions of the bodies to be joined together will be greater. The precise combination of temperature and time can be chosen by one of ordinary skill in the art by routine experimentation; however, it should be understood that the joining temperature should not exceed a temperature above which shape deformation of any of the bodies to be joined may occur.

The ability to join said at least two bodies together is a significant achievement because rather than forming a very complex-shaped preform of a bed or mass which is to be reactively infiltrated or a complex-shaped mold to contain a bed or mass of filler material which is to be reactively infiltrated, a plurality of simpler or less complex shaped preforms (or molds containing filler material) can be utilized to form self-supporting bodies in accordance with the first step of the invention. Such formed bodies can thereafter be bonded together to form a intricate or complex-shaped piece or a very large piece. Due to the nature of the joining mechanism, it can be extremely difficult, if not impossible, to distinguish any joint area from any other area of the formed body. Accordingly, this invention permits the formation of intricate and complex shapes, as well as large bodies, by combining a plurality of relatively simple shapes made by relatively simple techniques.

For example, if it was desired to form a "T-shaped" object, it would be possible to form each portion of the "T" independently by, for example, following the teachings according to the first step of the present invention; and thereafter cause each of the separate portions of the "T" to bond together. It is envisioned that a virtually unlimited combination of pieces could be joined together to form very complex shapes and/or very large pieces. Accordingly, the ability to form integral bonds between individual pieces is a significant achievement.

In a second embodiment of the second step of the present invention, the plurality of individual bodies which are bonded together do not consist entirely of materials made in accordance with the first step of the present invention. For example, materials such as metals, ceramics, etc., can be bonded to articles made in accordance with the first step of the invention. In this second embodiment of the second step of the invention, in order for bonding to occur, it is desirable for some type of reaction to occur between a body produced in accordance with the first step of the invention, and a second body.

In regard to the second embodiment of the second step of the present invention, and without wishing to be bound by any particular theory or explanation, it is possible, in the case of bonding a body made in accordance with the first step of the invention to a metal body, that some type of metallurgical bond may exist between parent metal contained in the body formed in accordance with the first step of the invention, and the metallic body which is to be bonded thereto. In this instance, some type of interdiffusion, alloying or formation of desirable intermetallics may occur at the joining area between the bodies to be bonded together. Alternatively, if one of the bodies to be bonded together comprises a conventional ceramic, it may be desirable for residual parent metal in a body formed in accordance with the first step of this invention to react in some manner (e.g., reduce) with at least a portion of the ceramic body which is to be bonded thereto.

A third embodiment of the second step of the present invention involves the placement of materials, similar to those utilized to form the self-supporting body of the first step of the present invention, between at least two bodies which are to be bonded together. Specifically, the joining area which exists between said at least two bodies which are to be bonded together can be filled with, for example, a powdered parent metal and a material which is to be reactively infiltrated. Alternatively, the joint can be filled with, for example, a material which is to be reactively infiltrated and a source of parent metal can be placed into contact with the material which is to be reactively infiltrated. Thus, a reaction is permitted to occur between the parent metal and the material which is to be reactively infiltrated so as to form a bonding zone at the joining area between the aforementioned at least two bodies.

In accordance with the third embodiment of the second step of the present invention, if the bodies to be joined are of similar composition (e.g., two bodies of the same composition formed in accordance with the first step of the present invention), then the processing conditions utilized to form the joint can be tailored so that the joining area is substantially indistinguishable from other areas of the aforementioned bodies to be joined. However, if the bodies to be joined have a very different composition, then the joining area will be distinguishable. However, bodies can be substantially different in composition and can still be joined together by the technique. For example, a body produced in accordance with the first step of the present invention can be bonded to, for example, a metal.

It is possible to envision that any number of macrocomposite bodies (i.e., bodies which comprise one or more different materials integrally bonded together) can be produced in accordance with the teachings of the present invention. Specifically, bodies made in accordance with the first step of the invention could be bonded to bodies of different composition made in accordance with the first step of the invention; bodies made in accordance with the first step of the invention could be bonded to other materials such as ceramic materials or other metals; etc. In each of these cases, either material could function as a substrate to the other, or as encasement member for the other, etc.

In a fourth embodiment of the second step of the present invention, an active brazing material is placed between two bodies formed in accordance with the first step of the present invention or, alternatively, the brazing material may be placed between one body formed in accordance with the first step of the present invention and a second body. Particularly, for example, a foil, paste or powder which comprises an active brazing alloy (e.g., titanium) is placed between at least two self-supporting bodies made in accordance with the first step of the present invention. Without wishing to be bound by any particular theory or explanation, it appears as though the active brazing alloy assists in the wetting and bonding the materials together. To achieve bonding by use of an active brazing alloy, the contacted bodies, containing therebetween the active brazing alloy in any suitable form, are heated to a temperature which permits the active brazing alloy to bond the bodies together.

In each of the above-discussed embodiments of the second step of the present invention, it may be desirable to bond together bodies made in accordance with the first step of the invention. In this case, it is possible that bodies produced in accordance with the first step of the present invention may comprise completely different parent metals and thus completely different reaction products. Alternatively, the bodies produced may have been produced by using very similar parent metals and thus very similar reaction products result. Accordingly, the present invention permits bonding to occur between dissimilar materials due to the inherent nature of the bond which is formed. Thus, the present invention permits the formation of relatively complex shapes and/or relatively large shapes due to the ability to bond similar or dissimilar bodies together in a secure manner.

The following are examples of the present invention. The Examples are intended to be illustrative of various aspects of the present invention, however, these examples should not be construed as limiting the scope of the invention.

EXAMPLE 1

This Example demonstrates a technique for joining a platelet reinforced composite to a steel. Specifically, a platelet reinforced composite body was brazed to a carbon steel using a foil of an active brazing alloy.

Figure 5:
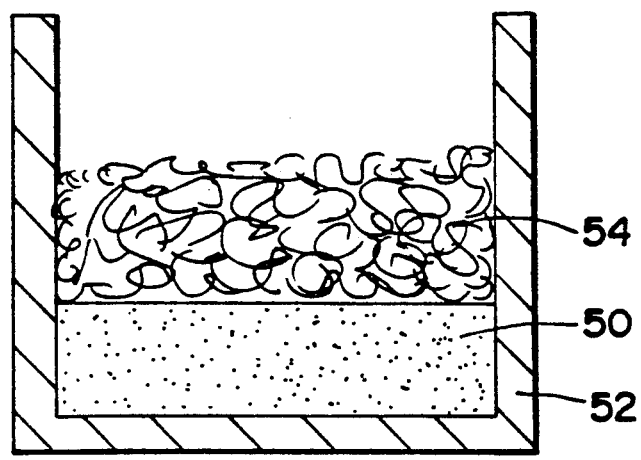
FIG. 5 is a schematic view of the lay-up used to fabricate the platelet reinforced composite body used in the joining operation of Example 2.

The setup used for fabricating the platelet reinforced composite bodies is shown schematically in FIG. 5.

A platelet reinforced composite body was fabricated by reactively infiltrating zirconium metal into a filler of boron carbide particulate. Specifically, a grade ATJ graphite mold 10 (Union Carbide Company, Carbon Products Division, Cleveland, Ohio) measuring, in its interior, about 4 inches (012 mm) square by about 3 inches (76 mm) tall was roughened on its inner surfaces with 120 grit silicon carbide abrasive paper.

The residual graphite dust was blown out of the mold using compressed air. The inside surfaces of the graphite mold 10 were then coated with a single layer of silicon nitride paint 12 (ZYP SN, ZYP Coatings, Inc., Oak Ridge, Tenn.). The coated graphite mold 10 was allowed to dry in air for about 16 hours followed by an approximately one hour drying in a forced air drying oven at a temperature of about 120° C. The coated graphite mold 10 was removed from the drying oven and allowed to cool to room temperature. About 206 grams of 1000 grit TETRABOR ® boron carbide particulate 14 (ESK-Engineered Ceramics, New Canaan, Conn.) having an average particle size of about 5 microns was poured into the silicon nitride coated 12 graphite mold 10 and leveled. The graphite mold 10 and its contents were then placed into a tap volume meter (Model 2003 STAV, Stampfvolumeter, J. Engelsmann, A. G., Federal Republic of Germany) and tap loaded about 1000 times to minimize entrapped air and pore space in the loose bedding of particulate boron carbide 14, thus consolidating the powder. About 1250 grams of nuclear grade zirconium sponge 16 (Western Zirconium, Ogden, Utah) was placed into the coated graphite mold 10 on top of the tap loaded layer of boron carbide particulate 14 to form a lay-up.

The lay-up was placed into a vacuum furnace. The furnace chamber was evacuated to about 30 inches (762 mm) of mercury vacuum using a mechanical roughing pump and backfilled with argon gas. The chamber was re-evacuated to a working pressure of about $2 \times 10^{-4}$ torr. The furnace temperature was then increased from substantially room temperature to a temperature of about 1950° C. at a rate of about 240° C. per hour. Upon reaching a temperature of about 1000° C., the furnace was backfilled with argon gas to a pressure of about 2 psig (14 kPag). An argon gas flow rate of about two liters per minute was established through the furnace. After maintaining a temperature of about 1950° C. for about two hours, the furnace was then cooled at a rate of about 154° C. per hour. After cooling to a temperature of about 100° C., the furnace was opened, and the lay-up was removed and disassembled to reveal a platelet reinforced composite body comprising zirconium diboride, zirconium carbide, and some residual zirconium alloy.

Figure 2:
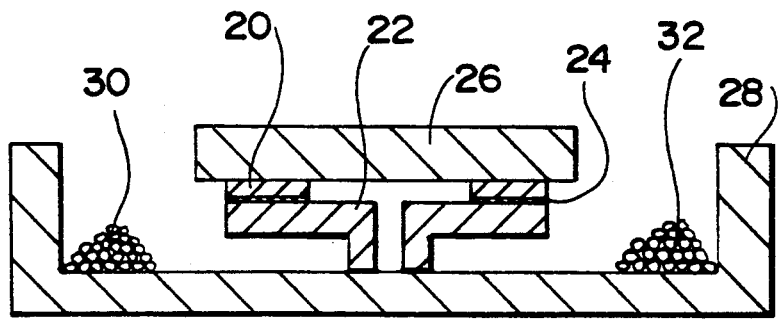
FIG. 2 is a schematic view of the setup used to carry out the joining operation for joining the platelet reinforced composite body fabricated as shown in FIG. 1 to a steel substrate, in accordance with Example 1.

The setup used to carry out the joining operation is shown schematically in FIG. 2.

Four (4) right rectangular pieces of the formed platelet reinforced composite material 20, each comprising by weight about 5.0% zirconium, 56.0% zirconium diboride, and about 39.0% zirconium carbide and each measuring about 1.281 inches (32.5 mm) in length, by about 0.266 inch (6.7 m) in width, and by about 0.246 inch (6.2 mm) in height was electrodischarge machined from the formed platelet reinforced composite material and then surface ground to their final dimensions. The residue from the grinding and machining process was removed using a series of silicon carbide abrasive papers, namely 60 grit, 120 grit, and 180 grit. The four (4) platelet reinforced composite samples, or coupons 20, were rinsed in acetone and then ultrasonically cleaned in acetone for about 5 minutes. The steel body 22 to be joined to the platelet reinforced composite material was prepared for joining by first flat grinding the surfaces to be joined, smoothing the ground surfaces with 60 grit, 120 grit, and 180 grit silicon carbide abrasive paper, and finally, cleaning off the grinding and sanding residues with acetone. The final acetone treatment comprised an approximately 5 minute soak in acetone in an ultrasonic bath. The ultrasonically cleaned steel body 22 was allowed to air dry.

Four (4) Cusin ABA-1 brazing alloy (comprising by weight about 66.5% silver, about 25.1% copper and about 8.3% titanium) foils 24 (GTE, Wesgo Products vision, Bellmont, Calif.) were cut slightly larger than the 1.281 inches (32.5 mm) by 0.266 inch (6.7 mm) area to be joined. Each brazing alloy foil 24 weighed between 0.11 and 0.14 grams. Each foil 24 was placed between the platelet reinforced composite material 20 and the steel substrate 22 and the bodies to be bonded were held in place with a graphite fixture 26. The steel substrate 22 was supported by a graphite dish 28 measuring about 10 inches (254 mm) square and about 1 inch (25 mm) deep. About 200 grams of titanium sponge 30 (Teledyne Wah Chang Albany, Albany OR)) and about 50 grams of nuclear grade zirconium sponge 32 (Western Zirconium, Ogden, Utah) were placed at opposite ends of the graphite dish 28 to complete the lay-up.

Figure 3:
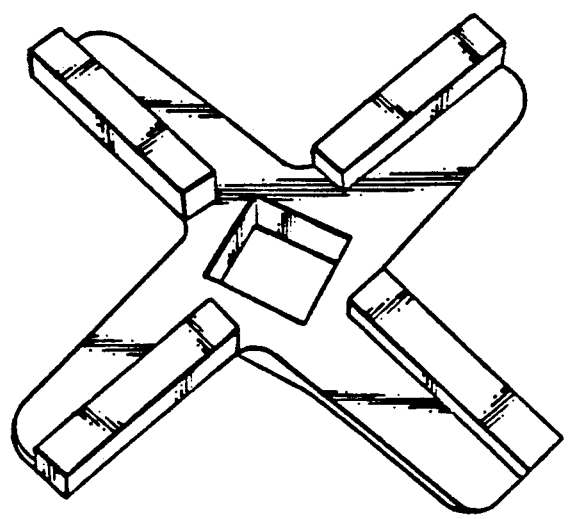
FIG. 3 is a photograph of the four (4) rectangular bars of platelet reinforced composite material brazed to a carbon steel blade formed in accordance with Example 1.

The lay-up was placed into a vacuum furnace at about room temperature. The furnace chamber was evacuated to about 30 inches (762 mm) of mercury vacuum and backfilled with argon gas. The furnace chamber was evacuated a second time to a working pressure of about 2 times $10^{-4}$ torr. The furnace temperature was then increased to about 750° C. at a rate of about 400° C. per hour. After maintaining a temperature of about 750° C. for about one hour, the furnace chamber was backfilled with argon gas to a pressure of about 2 psig (14 kPag). An argon gas flow rate of about two liters per minute was established. The furnace temperature was then increased to about 850° C. at a rate of about 250° C. per hour. After maintaining a temperature of about 850° C. for about 15 minutes, the furnace temperature was decreased at a rate of about 350° C. per hour. After the furnace had cooled to substantially room temperature, the furnace was opened and the lay-up was removed. Inspection of the steel 22 and platelet reinforced composite 20 assembly revealed that the four (4) rectangular bars of platelet reinforced composite material 20 were joined to the steel body 22. A photograph of the brazed assembly is shown in FIG. 3.

Figure 4:
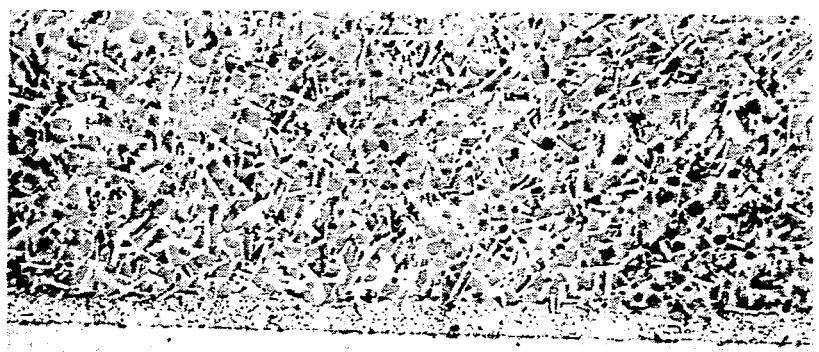
FIG. 4 is an approximately 100× magnification photomicrograph of a cross-section of the brazement between the composite material and carbon steel backing blade of Example 1.

One (1) of the four (4) brazed platelet reinforced composite bars was sectioned, mounted, and polished for optical microscopy. An approximately 100× magnification photomicrograph of the cross-section of the brazed region is shown in FIG. 4. The photograph shows that good bonding was achieved between the composite material and the steel substrate.

Shear strength measurements were carried out to measure the strength of the bond formed between the platelet reinforced composite material and the steel to which it was brazed. Specifically, the brazed assembly was mounted in a steel jig on the base of a Sintec Model CITS-2000/6 universal testing machine (System Integration Technology, Inc., Stoughton, Mass.). The assembly was oriented such that the bond area lay in a vertical plane and that the direction of the applied force was substantially transverse to the radial direction of the assembly (i.e., at a right angle to an imaginary line joining the center of the bond region to the center of the piece). The load was applied with an anvil of square cross-section attached to a load cell having a capacity of about 5,000 lbs. which in turn was attached to the crosshead of the universal testing machine. A compliant layer comprising several sheets of copper foil each measuring about 15 mils thick was placed between the moveable anvil and the brazed assembly. The anvil was brought down at a constant speed of about 0.51 millimeters per minute against the brazed assembly until the rectangular bar of platelet reinforced composite material failed as a result of the shear stresses set-up as a result of the applied shear load. The shear stress-caused failure was calculated by dividing the bond area into the maximum applied load.

A total of three (3) rectangular bars of brazed platelet reinforced composite material were shear tested by the technique described above. The measured shear strengths ranged from about 6,800 psi (47 MPa) to about 9700 psi (67 MPa).

In conclusion, this Example demonstrates a process for brazing a platelet reinforced composite body to a carbon steel substrate. A technique for measuring the strength of the brazement was described. Three measurements of the strength of the brazement were performed.

EXAMPLE 2

This Example demonstrates that through application of heat and pressure alone (i.e., without the incorporation of any kind of filler or brazing material between the bodies) that two bodies of platelet reinforced composite material can be joined to one another. The set-up used to accomplish the joining operation is shown schematically in cross-section in FIG. 6. The lay-up used to fabricate the platelet reinforced composite bodies to be joined to one another is shown schematically in FIG. 5.

About 300 grams of methylene chloride was placed into a 1½ gallon (1.9 liter) NALGENE ® plastic jar (Nalge Company, Rochester, N.Y.). About 2.0 grams of XUS 40303.00 experimental binder (Dow Chemical Company Midland, Mich.) was dissolved into the methylene chloride solvent to form a binder solution. About 200 grams of 1,000 grit TETRABOR ® boron carbide particulate was then stirred into the binder solution in the plastic jar to form a slurry.

As shown in FIG. 5, a grade AGSX graphite mold 52 (Union Carbide Corporation, Carbon Product Division, Danbury, Conn.) measuring about 2.0 inches square (50 mm) and about 2.25 inches (55 mm) deep as measured in its interior was soaked for about one hour in methylene chloride to saturate the graphite with the solvent. After the soaking operation, some of the boron carbide slurry was sediment cast into the soaked graphite mold 52. Specifically, a sediment cast preform 50 was fabricated by pouring the slurry into the mold and allowing the boron carbide particulate to settle out of the slurry and form a dense packed bed. The bulk residual binder solution was daubbed off of the top surface of the sediment cast preform 50 in the graphite mold 52. The graphite mold 52 and its sediment cast preform 50 contained within was then placed into a drying box at room temperature to remove the residual methylene chloride solvent in a slow and controlled manner to avoid rupturing the sediment cast preform 50 of boron carbide. After drying in the drying box for about 24 hours, virtually all of the methylene chloride had been removed. The mass of the sediment cast preform 50 was found to be about 41.6 grams and its thickness about 0.8 inch (20 mm).

The graphite mold 52 and its dried sediment cast preform 50 contained within was then placed into the chamber of a resistance heated controlled atmosphere furnace. The furnace chamber was evacuated to about 30 inches (762 mm) of mercury vacuum and back-filled with argon gas a total of three times to purge the furnace chamber of any residual air. An argon gas flow rate of about two liters per minute through the furnace at an over pressure of about 1 psi (7 kPa) was established. The furnace temperature was then raised from approximately room temperature to a temperature of about 300° C. at a rate of about 108° C. per hour. The temperature was then increased from about 300° C. to about 400° C. at a rate of about 10° C. per hour. The temperature was then increased from about 400° C. to about 600° C. at a rate of about 67° C. per hour. After maintaining a temperature of about 600° C. for about four hours, substantially all of the ceramic binder had been removed from the sediment cast preform. Accordingly, the furnace temperature was decreased to substantially room temperature at a rate of about 300° C. per hour. After cooling to substantially room temperature, the graphite mold 52 and sediment cast preform 50 was removed from the furnace.

About 297 grams of zirconium sponge 54 (Consolidated Astronautics Saddle Brook, N.J.) was placed into the graphite mold 52 over the sediment cast preform 50 of boron carbide and levelled to form a lay-up. The layup was placed into a resistance heated controlled atmosphere furnace. The furnace was evacuated to about 30 inches (762 mm) of mercury vacuum and then back-filled with argon gas. An argon gas flow rate of about two liters per minute through the furnace at an over pressure of about 2 psi (14 kPa) was established. The furnace temperature was then increased from about room temperature to about 1900° C. at a rate of about 375° C. per hour. After maintaining a temperature of about 1900° C. for about two hours, the furnace temperature was decreased at a rate of about 375° C. per hour. When the furnace temperature had reached substantially room temperature, the lay-up was removed from the furnace. The contents of the graphite mold 52 were removed from the mold to reveal that the zirconium metal 54 had infiltrated and reacted with the sediment cast boron carbide preform 50 to produce a platelet reinforced composite body comprising zirconium diboride, zirconium carbide, and some residual metal.

A section of the formed platelet reinforced composite body was made using an electro-discharge machining. The machine section was mounted in a thermoplastic polymer material and polished with diamond polishing paste for subsequent examination in the optical microscope. Quantitative image analysis of an optical image of the polished section of the platelet reinforced composite body revealed the presence of about 7.7 volume percent residual metal in the composite.

Figure 6:
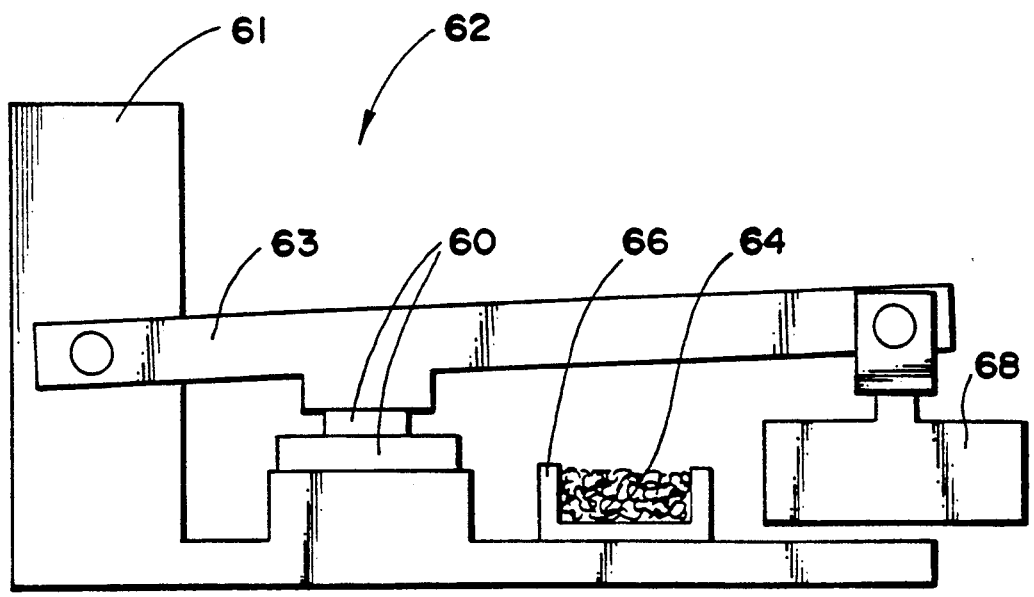
FIG. 6 is a schematic view of the setup employed in the joining operation described in Example 2.

Test coupons 60 of the platelet reinforced composite body were electro-discharge machined from the 2.0 inches (51 mm) square platelet reinforced composite tile described above. Each coupon 60 measured about 0.645 inch (16.4 mm) in length by about 0.19 inch (4.8 mm) thick. One of the coupons 60 measured about 0.4 inch (10 mm) in width while the other measured about 0.45 inch (11.4 mm) in width. As shown in FIG. 6, the test coupons 60 were oriented within the graphite jig 62 in such a way that the side or face of each coupon 60 having a largest area was contacted with the other coupon 60. The orientation was such that the long dimension of each coupon 60 was at an approximate right angle to that of the other coupon 60. The area of contact or overlap amounted to about 0.25 square inch (164 square mm). The graphite jig 62 and the test coupons 60 to be joined to one another were placed into a resistance heated controlled atmosphere furnace. About 200 grams of zirconium sponge 64 (Consolidated Astronautics, Saddle Brook, N.J.) were placed into a graphite dish 66 which in turn was also placed into the chamber of the controlled atmosphere furnace to serve as a gettering agent for any residual oxygen or nitrogen impurity in the furnace. A mass of about 2.2 kilograms 68 was suspended from the end of the lever arm such that the applied pressure on the platelet reinforced composite test coupons 60 amounted to about 150 psi (1.0 MPa). The furnace chamber was evacuated to about 30 inches (762 mm) mercury vacuum and then back-filled with argon gas. An argon gas flow rate of about two liters per minute was established through the furnace chamber at an over pressure of about 2 psi (14 kPa). The furnace temperature was then increased from about room temperature to a temperature of about 1800° C. at a rate of about 400° C. per hour. After maintaining a temperature of about 1800° C. for about ½ hour, the furnace temperature was decreased at a rate of about 350° C. per hour. After the furnace temperature had decreased to substantially room temperature, the graphite jig 62 and its test coupons 60 to be joined to one another were removed from the furnace and inspected. The two (2) platelet reinforced composite test coupons 60 could not be separated from one another using hand pressure.

Figure 7:
FIG. 7 is an approximately 180× magnification photomicrograph of the joint region between the two platelet reinforced composite bodies of Example 2.

The joined platelet reinforced composite test coupons 60 were sectioned using electro-discharge machining. The cut section was then mounted and polished with diamond paste for subsequent examination in the optical microscope. At approximately 180× magnification photomicrograph of the joint region is shown in FIG. 7. No evidence of a former boundary between the coupons 60 was visible, suggesting mutual penetration of zirconium diboride and zirconium carbide from each test coupon into the other.

This Example therefore illustrates a technique for joining two platelet reinforced composite bodies to one another by heating said bodies to a semi-liquid state and contacting the surfaces of the bodies under a modest pressure. Quality bonds were formed in short periods of time under relatively low pressures.

EXAMPLE 3

Figure 8:
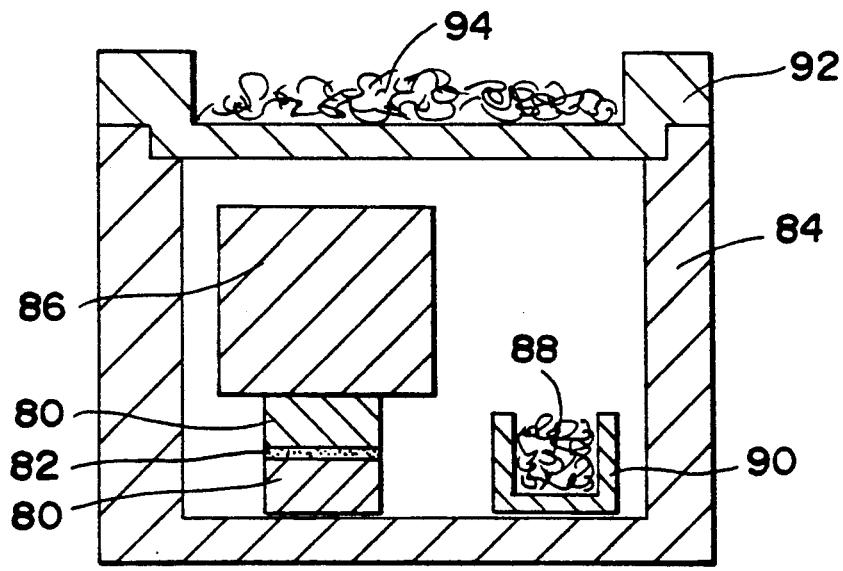
FIG. 8 is a schematic view of the setup used for carrying out the joining operation described in Example 3.

This Example demonstrates that one platelet reinforced composite body can be joined to another by forming a thin platelet reinforced composite layer at the interface. The set up for carrying out such a joining means is illustrated schematically in FIG. 8.

A platelet reinforced composite body measuring about 2.0 inches (51 mm) square by about 0.73 inch (18.5 mm) thick was made by substantially the same techniques as the platelet reinforced composite made in Example 2. The sediment cast boron carbide particulate preform, after firing in an argon atmosphere to remove the ceramic binder, weighed about 58.6 grams. The bulk density of the boron carbide preform was calculated to be about 1.22 grams per cubic centimeter or about 48.4% of theoretical density.

About 430.5 grams of zirconium sponge (Consolidated Astronautics Division of United-Guardian, Inc., Hauppauge, N.Y.) was placed into the graphite mold over the fired boron carbide preform and levelled to form a lay-up. The lay-up was placed into a resistance heated controlled atmosphere furnace and exposed to substantially the same atmosphere and temperature as the lay-up in Example 2. A platelet reinforced composite body was recovered from the graphite molds after the furnace had cooled to substantially room temperature. The platelet reinforced composite comprised zirconium diboride, zirconium carbide, and some residual metal.

Two (2) test coupons 80 each measuring about 0.75 inch (19 mm) long by about 0.33 inch (8.4 mm) wide by about 0.125 inch (3.2 mm) thick were machined from the previously described composite using electro-discharge machining. The test coupons 80 were sand blasted and then cleaned ultrasonically in an acetone bath, then allowed to air dry. The test coupons weighed about 3.1 grams each.

A brazing filler material 82 comprising particulates of a parent metal and a solid oxidant was prepared. Specifically, about 67.1 grams of zirconium particulate (−325 mesh, Atlantic Equipment Engineers, Burgenfield, N.J.), having substantially all particles smaller than about 45 microns in diameter, about 1.1 grams of ELMERS® Professional Carpenter's Wood Glue (Borden Company, Columbus, Ohio), about 5 grams of 1,000 grit TETRABOR® boron carbide particulate (Exolon-ESK Company, Tonawanda, N.Y.) and about 48.1 grams of distilled water were combined in a one liter NALGENE® plastic jar (Nalge Company, Rochester, N.Y.) to form a slurry 82. A quantity of this slurry was brushed onto the largest base on each of the test coupons, and the test coupons were cemented together with the slurry. After the slurry 82 had dried, the mass of the assembly was measured and the quantity of dried particulates and glue, which had been applied between the faces, amounted to about 0.35 grams.

Figure 9:
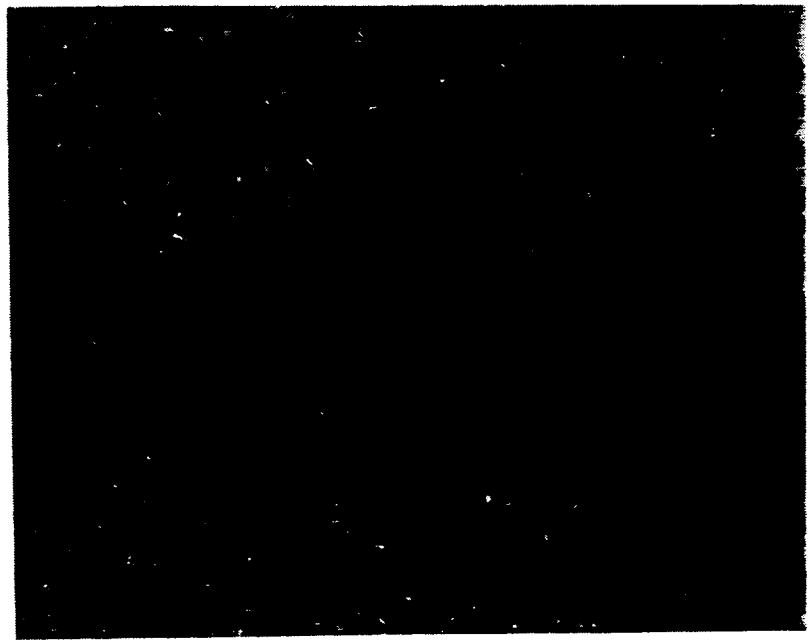
FIG. 9 is an approximately 200× magnification photomicrograph of the boundary region between the newly formed platelet reinforced composite material and the original platelet reinforced composite body described in Example 3.

The test coupons 80 which were loosely cemented together with the dried slurry admixture 82 were placed into a graphite boat 84 and fixed in place with a weight 86 on top of the test coupon assembly 80,82. Specifically, the weight 86 anchoring the test coupon assembly 80 in place comprised a portion of platelet reinforced composite tile measuring about 2.0 inches (51 mm) long by about 1.0 inch (25 mm) wide by about 0.75 inch (19 mm) thick. About 200 grams of zirconium sponge 88 (Consolidated Astronautics Division of United-Guardian, Inc., Hauppauge, N.Y.) was poured into a graphite crucible 90 measuring 2.0 inches (51 mm) square by about 3.0 inches (76 mm) deep. The graphite crucible 90 and its contents of zirconium sponge 88 were placed into the graphite boat 84 to serve as a getter for oxygen and nitrogen impurities. A graphite lid 92 was placed on top of the graphite boat 84, but no effort was made to seal the lid to the boat. About 200 grams of additional zirconium sponge 94 (Consolidated Astronautics, new Canaan, Conn.) were poured evenly over the top surface of the graphite lid 92 to serve as additional gettering material for gaseous impurities. The graphite boat 84 and its contents were placed into a resistance heated controlled atmosphere furnace. The furnace chamber was evacuated to about 30 inches (762 mm) of mercury vacuum and back-filled with argon gas. An argon gas flow rate of about two liters per minute was established through the furnace at an over pressure of about 2 psi (14 kPa). The furnace temperature was increased from about room temperature to a temperature of about 1900° C. at a rate of about 400° C. per hour. After maintaining a temperature of about 1900° C. for about 10 minutes, the temperature was decreased at a rate of about 350° C. per hour. After cooling to substantially room temperature, the graphite boat 84 and its contents were removed from the furnace and disassembled. The platelet reinforced composite test coupons 80 were found to have bonded to one another. The fillet or bond line between the test coupons appeared wedge shaped, perhaps due to uneven loading during the furnace run. A section of the bond region was removed from the side of the assembly where the test coupons 80 were closest to one another using electro-discharge machining. An approximately 320× magnification optical photomicrograph of the mounted and polished cross-section of the bond region is shown in FIG. 9. The photomicrograph reveals that the joint region, like the platelet reinforced composite test coupons, comprises zirconium diboride 100, zirconium carbide 62, and some residual metal 104. The size of the microstructural features, however, appears smaller than those corresponding features in either of the original platelet reinforced composite test coupons.

EXAMPLE 4

This Example demonstrates a further embodiment of the technique of joining a platelet-reinforced composite body to a steel substrate by a brazing operation. The setup employed in carrying out the fabrication of the platelet-reinforced composite body is substantially the same as that shown in FIG. 5. The setup employed in carrying out the brazing operation is shown schematically in FIGS. 10 and 11.

A platelet-reinforced composite was fabricated by reactively infiltrating zirconium metal into a filler of boron carbide particulate, as described herein.

As shown in FIG. 5, a Grade ATJ graphite crucible 52 (Union Carbide Company, Carbon Products Division, Cleveland, Ohio) measuring about 3.0 inches (76 mm) square in its interior by about 3.25 inches (83 mm) tall was roughened on its inner-surfaces with approximately 120 grit silicon carbide abrasive paper. The residual graphite dust was blown out of the crucible using compressed air.

About 0.46 grams of XUS 40303.00 Experimental Binder (Midland, Mich.) was placed into an approximately 8 ounce (0.24 liter) NALGENE® plastic jar (Nalge Company, Rochester, N.Y.) along with about 77.2 grams of isopropyl alcohol. The plastic jar was sealed, and the jar and its contents were placed onto an EBERBACH ® paint shaker (Eberbach Corporation, Ann Arbor, Mich.) and shaken for about 1½ hours to completely dissolve the binder into the isopropyl alcohol. The plastic jar and its contents were then removed from the paint shaker, and about 91.15 grams of 1000 grit TETRABOR ® boron carbide particulate (ESK Engineered Ceramics, New Canaan, Conn.) having an average particle size of about 5 microns was added to the contents of the Jar. The plastic jar and its contents were then returned to the EBERBACH ® shaker and shaken for about two hours to thoroughly mix the boron carbide particulate with the binder solution. The plastic jar and its contents were then removed from the shaker, and the slurry of boron carbide and binder solution was sediment cast by pouring the slurry into the graphite crucible and allowing the boron carbide particulate to settle out. The graphite crucible 52 and its contents were then placed into an evaporating chamber to remove the isopropyl alcohol in a controlled manner. After drying the sediment cast preform 50 in the evaporating chamber for about 16 hours, the isopropyl alcohol had evaporated to the point where none was visible on top of the sediment casting. The door to the evaporating chamber was opened slightly and the evaporating/drying operation was continued for about an additional two hours. The graphite crucible 52 and the sediment cast preform 50 contained within the crucible were removed from the evaporation chamber and placed into a drying oven. After further drying at a temperature of about 45° C. for about one hour, the graphite crucible and its contents were transferred to a second drying oven at a temperature of about 70° C. After drying at a temperature of about 70° C. for about one hour, virtually all of the isopropyl alcohol had been removed from the sediment cast boron carbide preform 50.

The graphite crucible 52 and its contents were then placed into a vacuum furnace. The vacuum chamber was evacuated to a vacuum of about 30.0 inches (762 mm) of mercury and backfilled with argon gas. After repeating this evacuation and backfilling procedure, an argon gas flow rate of about two liters per minute through the vacuum chamber was established. The furnace temperature was then increased from about room temperature to a temperature of about 200° C. at a rate of about 100° C. per hour. At a temperature of about 200° C., the temperature was then increased to about 350° C. at a rate of about 20° C. per hour. At a temperature of about 350° C., the temperature was then increased to about 670° C. at a rate of about 107° C. per hour. After maintaining a temperature of about 670° C. for about two hours, the furnace temperature was then decreased at a rate of about 80° C. per hour. At about room temperature, the furnace was opened and the graphite crucible 52 and its contents were removed. The sediment cast boron carbide preform 50 contained within the graphite crucible 52 was found to have a mass of about 89.2 grams and dimensions of about 3.04 inches (77 mm) square by about 0.49 inch (12 mm) thick. A green density of about 1.21 grams per cubic centimeter or about 48% of the theoretical density of boron carbide was thereby computed. The change in mass upon firing in an argon atmosphere to a temperature of about 670° C. indicated that the binder had been removed by this operation.

About 595.8 grams of nuclear grade zirconium sponge 54 (Western Zirconium Company, Ogden, Utah) was poured into the graphite crucible 52 on top of the sediment cast boron carbide preform 50 and levelled to form a lay-up. The lay-up was placed into the vacuum chamber of a vacuum furnace. The vacuum chamber was evacuated to a vacuum of about 30.0 inches (762 mm) of mercury using a mechanical roughing pump and then backfilled with argon gas. The vacuum chamber was pumped out again using the roughing pump. After achieving about 30.0 inches (762 mm) of mercury vacuum, a high vacuum source was connected to the vacuum chamber and the chamber was evacuated further to a final working pressure of about $1.2 \times 10^{-5}$ torr. The furnace temperature was then increased from about room temperature to a temperature of about 1950° C. at a rate of about 240° C. per hour. After reaching a temperature of about 1000° C., the high vacuum source was isolated from the vacuum chamber, and the chamber was backfilled with argon gas. An argon gas flow rate of about two liters per minute through the chamber at an over pressure of about 2 psi (14 kPa) was established. After maintaining a temperature of about 1950° C. for about two hours, the furnace temperature was decreased to a temperature of about 1500° C. at a rate of about 90° C. per hour. At a temperature of about 1500° C., the furnace temperature was then further decreased at a rate of about 300° C. per hour. When the furnace temperature had reached about room temperature, the lay-up was removed from the furnace. The contents of the graphite crucible 52 were removed from the crucible to reveal that the zirconium metal 54 had infiltrated and reacted with the sediment cast boron carbide preform 50 to produce a platelet-reinforced composite comprising zirconium diboride, zirconium carbide, and some residual metal.

Figure 10:
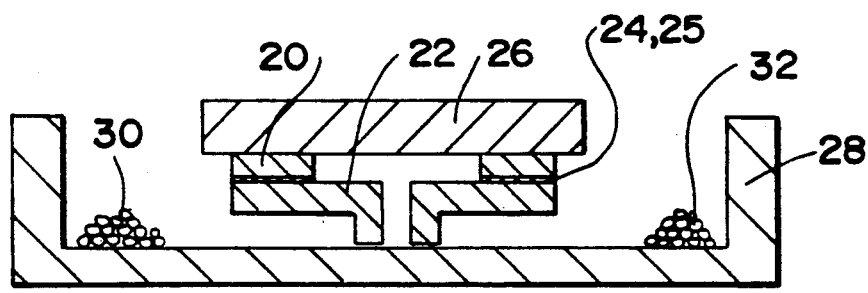
FIG. 10 is a schematic view of the lay-up used to carry out the joining operation described in Example 4.
Figure 11:
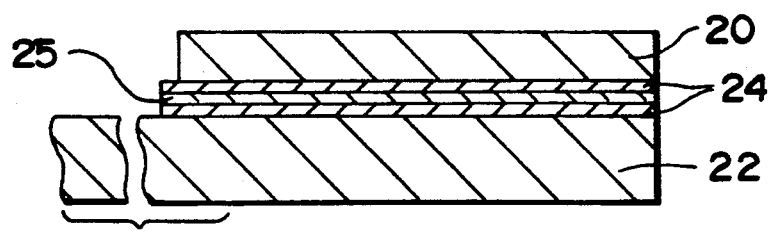
FIG. 11 is a schematic view of a portion of the lay-up used to carry out the joining operation described in Example 4.

Referring to FIGS. 10 and 11, four (4) right rectangular bars 20 of platelet-reinforced composite material were electro-discharge machined from the formed platelet-reinforced composite and then surface ground to final dimensions of about 1.281 inches (32.5 mm) long by about 0.266 inch (6.7 mm) wide by about 0.246 inch (6.2 mm) high. The residue from the grinding and machining operations was removed using 60 grit, 120 grit, and 180 grit, respectively, silicon carbide abrasive papers. The four (4) rectangular bars 20 were then rinsed in acetone and ultrasonically cleaned in acetone for about five minutes.

The steel body 22 to be joined to the platelet-reinforced composite bars 20 (hereafter referred to as a "backing plate") was of substantially the same size, shape, and chemical composition as the steel body 22 described in Example 1. Specifically, the steel backing plate 22 comprised by weight about 0.38–0.43% C, about 0.60–0.80% Mn, ≦0.040% P, ≦0.040% S, about 0.20–0.35% Si, about 1.65–2.00% Ni, about 0.20–0.30% Mo, and the balance Fe (nominally American Iron and Steel Institute Alloy No. 4640). This steel backing plate 22 was prepared for joining by first flat grinding the surfaces to be joined, smoothing the ground surfaces with 60 grit, 120 grit, and 180 grit silicon carbide abrasive paper, respectively, and cleaning off the grinding and sanding residues with acetone. The final cleansing treatment comprised an approximately five minute soak in acetone in an ultrasonic bath. The ultrasonically cleaned steel backing plate 22 and platelet-reinforced composite bars 20 were allowed to air dry.

Eight (8) Cusin-ABA-1 brazing alloy foils 24 (GTE, Wesgo Products Division, Belmont, Calif.) were cut slightly larger than the about 1.281 inches (32.5 mm) by about 0.266 inch (6.7 mm) to be joined. Each brazing alloy foil 24 weighed between about 0.11-0.12 grams. A grade OFHC copper foil 25 (Lucas-Milhaupt, Cudahy, Wis.) measuring about 0.005 inch (0.13 mm) thick and having substantially the same length and width dimensions as the brazing alloy foils 24 described above was placed between a pair of the brazing alloy foils 24 and oriented similarly (see FIG. 11). Each of the four (4) foil assemblies was then placed between a rectangular bar 20 and a steel backing plate 22. Each assembly, comprising foil assembly 24 and 25, the rectangular bars 20 and the steel backing plate 22, was held in place with a graphite fixture 26 as shown in FIG. 10. The steel backing plate 22 was supported by a graphite dish 28 measuring about 10.0 inches (254 mm) square by about 1.0 inch (25 mm) deep. About 200 grams of titanium sponge 30 (Teledyne Wah Chang Albany, Albany, Oreg.) and about 50 grams of nuclear grade zirconium sponge 32 (Western Zirconium, Ogden, Utah) were placed at opposite ends of the graphite dish 28 to complete the setup.

The setup was placed into a vacuum furnace at about room temperature. The vacuum chamber was evacuated to about 30.0 inches (762 mm) of mercury vacuum using a mechanical roughing pump and backfilled with argon gas. The vacuum chamber was evacuated a second time to a vacuum of about 30.0 inches (762 mm) of mercury with the roughing pump, after which a source of high-vacuum was connected to the vacuum chamber to pump said chamber down to a final working pressure of about $2 \times 10^{-4}$ torr. The furnace temperature was then increased to about 850° C. at a rate of about 900° C. per hour. Upon reaching a temperature of about 750° C., the high-vacuum source was isolated from the vacuum chamber and the chamber was backfilled with argon gas to a pressure of about 2 psig (14 kPag). An argon gas flow rate of about two liters per minute was then established through the chamber and maintained for the balance of the furnace run. After holding at a temperature of about 850° C. for about 15 minutes, the furnace temperature was decreased to about 800° C. at a rate of about 300° C. per hour. At a temperature of about 800° C., the furnace temperature was then decreased to about 400° C. at a rate of about 120° C. per hour. At a temperature of about 400° C., the furnace temperature was then decreased at a rate of about 300° C. per hour. After the furnace had cooled to about room temperature, the furnace was opened and the lay-up was removed. Inspection of the steel and platelet-reinforced composite assembly revealed that the four (4) rectangular bars 20 were joined to the steel backing plate 22. The brazed assembly looked substantially the same as the assembly shown in FIG. 3.

Figure 12:
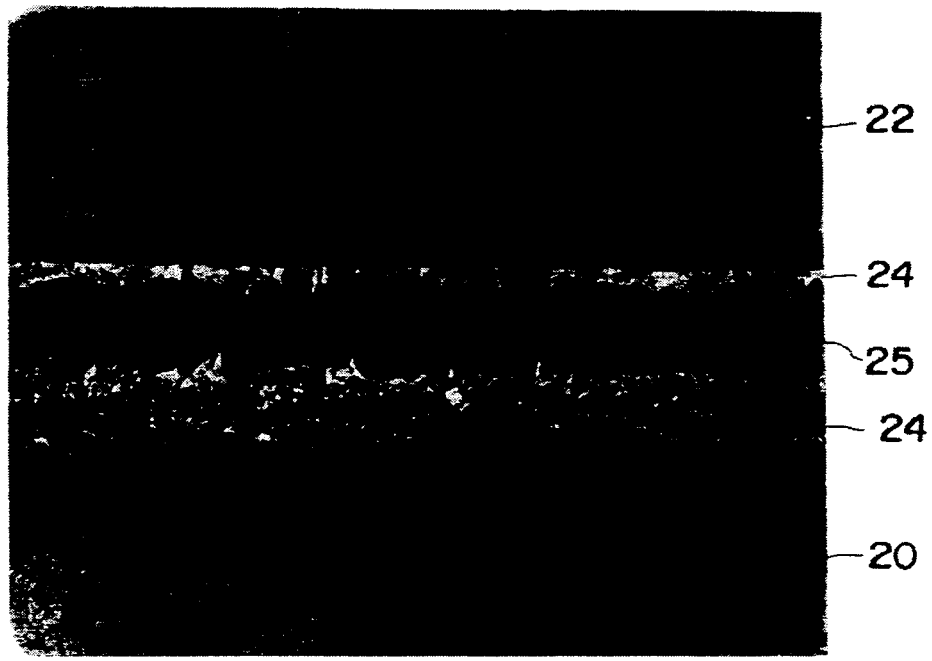
FIG. 12 is an approximately 100× magnification photomicrograph of a cross-section of the brazement formed in Example 4.

One (1) of the four (4) brazing junctions between the plateletreinforced composite and the steel backing plate was sectioned, mounted, and polished for examination in an optical microscope. An approximately 100× magnification photomicrograph of the cross-section of the brazed region is illustrated in FIG. 12, showing intimate contact between the platelet-reinforced composite material 20, the three (3) foils 24, 25, and the steel substrate 22.

Shear strength measurements were carried out on the brazed assembly in substantially the same manner as described in Example 1. The average shear stress of three tests was about 9220 psi (64 MPa) with a standard deviation of about 158 psi (1.1 MPa).

This Example thus demonstrates another embodiment of a process for brazing a platelet-reinforced composite body to a carbon steel substrate.

EXAMPLE 5

Figure 13:
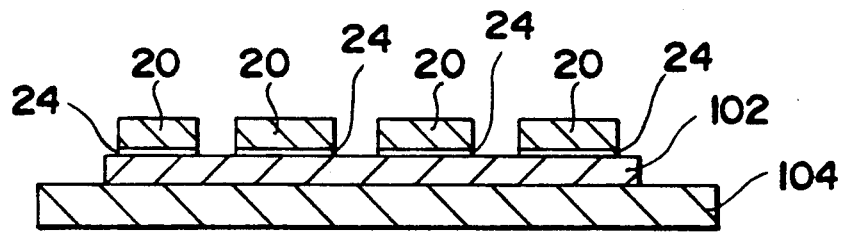
FIG. 13 is a schematic illustration of the setup employed in carrying out the brazing step by induction heating in Example 5.

This Example demonstrates the use of induction heating to join a platelet-reinforced composite body to a steel substrate by a brazing operation. The setup used to accomplish the brazing operation is shown schematically in FIG. 13.

A platelet-reinforced composite body was fabricated by substantially the same technique as was employed in fabricating the body described in Example 2, as illustrated in FIG. 5.

Four (4) right rectangular prisms 20 of the platelet-reinforced composite body were electro-discharge machined from the platelet-reinforced composite material and then surface ground to a final dimension of about 0.39 inch (10 mm) square by about ⅛ inch (3 mm) in height. The residue from the grinding and machining processes was removed using, 60 grit, 120 grit, and 180 grit, respectively, silicon carbide abrasive paper. One (1) of the two (2) square faces of each of the platelet-reinforced composite prisms 20 was polished using progressively finer diamond polishing compound, with the finest, i.e., the last polish in the series, having diamond particles averaging about 1.0 micron in size. The platelet-reinforced composite prisms 20 were then rinsed in acetone followed by an ultrasonic cleaning treatment in acetone for about five minutes.

A carbon steel substrate 102 measuring about 2½ inches (63 mm) long by about 1.0 inch (25 mm) wide by about ⅛ inch (3 mm) thick was prepared for brazing to the rectangular prisms 20 by flat grinding the approximately 2½ inch (63 mm) by about 1.0 inch (25 mm) face, smoothing the ground surface with 60, 120, and 180, respectively, grit silicon carbide abrasive paper, and finally polishing the surface to be brazed to the platelet-reinforced composite prisms 20 with approximately 1200 FEPA (600 grit) silicon carbide abrasive paper. The residues from grinding, sanding, and polishing were removed by first rinsing the steel substrate in an acetone bath, then giving the steel substrate an approximately five minute ultrasonic cleansing treatment in an acetone bath. After cleaning, the rectangular prisms 20 and the steel substrate 102 were allowed to dry in air.

The following Samples describe various lay-ups used to join a rectangular prism 20 to a carbon steel substrate 102.

Sample A

A Cusin-1-ABA brazing alloy foil 24 (GTE Wesgo Division, Belmont, Calif.) measuring about 0.39 inch (10 mm) square by about 0.002 inch (0.05 mm) thick was placed flat onto the carbon steel substrate 102. One (1) rectangular prism 20 was then placed on top of the brazing alloy foil 24 such that its polished face completely contacted the brazing alloy foil 24 to form a lay-up.

Sample B

The lay-up of Sample B was substantially the same as the lay-up of Sample A, except that the orientation of the rectangular prism 20 was such that the un-polished square face contacted the Cusin-1-ABA brazing alloy foil 24.

Sample C

The lay-up of Sample C was substantially the same as the lay-up for Sample A, except that two (2) Cusin-1-ABA brazing alloy foils 24 were placed between the rectangular prism 20 and the carbon steel substrate 102.

Sample D

The lay-up of Sample D was substantially the same as the lay-up of Sample C, except that the orientation of the rectangular prism 20 was such that the un-polished square face contacted the two (2) Cusin-1-ABA brazing alloy foils 24.

Figure 14:
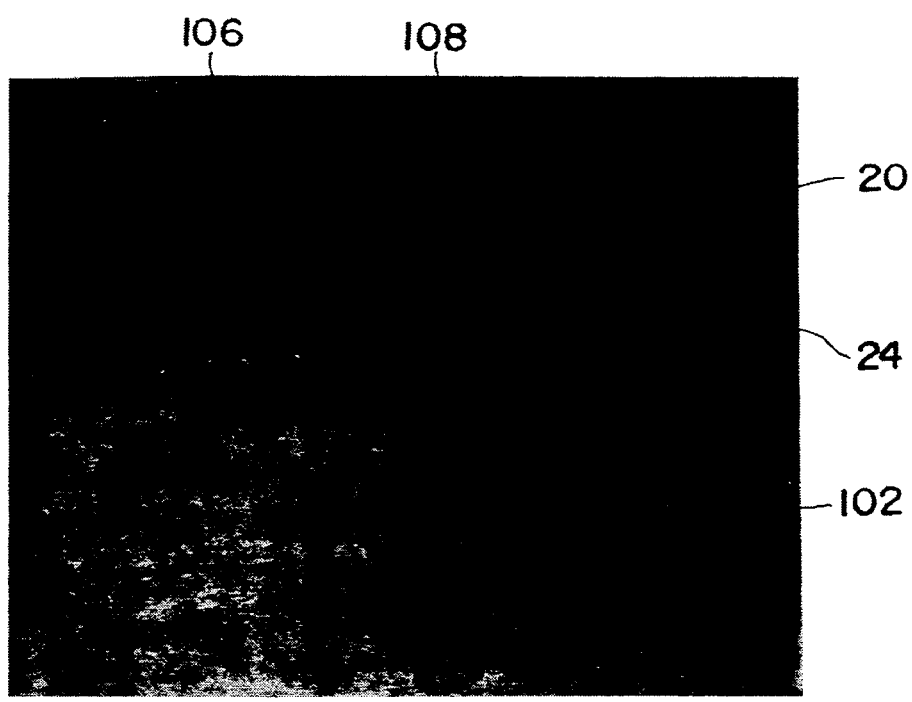
FIG. 14 is an approximately 100× magnification photomicrograph of the cross-section of the brazement formed in Sample A of Example 5.

The setup comprising the carbon steel substrate 102 and the brazing alloy foils 24 with the rectangular prisms 20 of Samples A–D mounted thereon was placed onto a support plate 104 in an inductively heated controlled atmosphere furnace. The furnace chamber was first evacuated to a vacuum of about 30.0 inches (762 mm) of mercury using a mechanical roughing pump and then backfilled with argon gas to about atmospheric pressure. An argon gas flow rate of about 0.5 liter per minute was established through the furnace. The furnace temperature was then increased from about room temperature to a temperature of about 1000° C. at a rate of about 70° C. per minute. After maintaining a temperature of about 1000° C. for about five minutes, the furnace temperature was decreased at a rate of about 30° C. per minute. After the sample had cooled to about room temperature, the furnace chamber was opened and the carbon steel substrate 102 and the lay-ups assembled thereon were removed. Visual inspection showed that all of the rectangular prisms 20 were bonded to the carbon steel substrate 102. The Sample A lay-up was sectioned, mounted, and polished with diamond paste for examination of the bonded region in an optical microscope. An approximately 100× magnification photomicrograph of a cross-section of the bonded region is shown in FIG. 14. The photomicrograph shows that the region between the platelet-reinforced composite material 20 and the steel substrate 102 is substantially completely filled with brazing alloy 24, suggesting that the brazing alloy foil material 24 bonded to the surface 106 of the rectangular prism 20, and to the surface 108 of the steel substrate 102, thus joining the two (2) materials to one another.

This Example therefore demonstrates that a platelet-reinforced composite body can be joined to a carbon steel body by means of a brazing operation employing induction heating.

EXAMPLE 6

This Example demonstrates the use of a protective zirconium foil pouch or envelope to help maintain an inert, non-oxidizing atmosphere around the brazing lay-up. The setup used to accomplish the brazing operation is shown schematically in cross-section in FIG. 15.

A platelet-reinforced composite body was fabricated by substantially the same technique as was employed in fabricating the body described in Example 2.

A section of the formed platelet-reinforced composite body was cut using electro-discharge machining. The machined section was mounted in plastic and polished with progressively finer diamond polishing pastes in preparation for examination using an optical microscope. The finest (last) polish contained diamond particles averaging about 1.0 micron in size. This polished sample was placed into a Model 500 PSEM scanning electron microscope (Philips, N.V., Eindhoven, The Netherlands) and ten (10) backscattered electron images were photographed. These photographs were then placed on a light table and video images of each photograph were obtained by viewing through a DAGE-MTI Series 68 video camera (DAGE-MTI, Inc., Michigan City, Ind.). The video signal was sent to a Model DV-4400 Scientific Optical Analysis System (Lamont Scientific of State College, Pa.) and then stored. Specific color and gray level intensity ranges were assigned to specific microstructural features (platelets, ceramic matrix, metal, pores). To verify that the color assignments were accurate, a comparison was made between a video image with assignments and the original black and white image. If discrepancies were noted, corrections were made to the video image assignments with a Model 2200/2210 39C2 hand held digitizing pen and digitizing board (Numonics Corporation, Lansdale, Pa.). Representative video images with assignments were analyzed automatically by the computer software contained in the Lamont Scientific Optical Analysis System to give area percent platelets, area percent ceramic matrix, area percent metal, and area percent porosity, which are substantially the same as volume percents. Quantitative image analysis using the aforementioned technique revealed that the platelet-reinforced composite body contained about five volume percent of residual metal.

A right rectangular bar 20 was electro-discharge machined from the same platelet-reinforced composite material discussed above and then surface ground to a final dimension of about 1.0 inch (25 mm) in length, by about ¼ inch (6 mm) in width, by about ¼ inch (6 mm) in height. The residue from the grinding and machining process was removed using 60 grit, 120 grit, and 180 grit, respectively, silicon carbide abrasive paper. The surface of the rectangular bar 20 to be brazed to a steel sample 102 was polished using progressively finer diamond polishing compounds, with the finest (last) in the series having diamond particles averaging about 1.0 micron in size. The rectangular bar 20 was then rinsed in acetone and then ultrasonically cleaned for approximately five minutes in an acetone bath.

Two (2) carbon steel test coupons 102 each measuring about 2½ inches (63 mm) long, by about 1.0 inch (25 mm) wide, by about ⅛ inch (3 mm) thick, were prepared for brazing to the platelet-reinforced composite test bar by flat grinding the surfaces to be joined, smoothing the ground surfaces with 60, 120, and 180 grit, respectively, silicon carbide abrasive paper, and finally polishing the surface to be brazed to the platelet-reinforced composite body with approximately 1200 FEPA (600 grit) silicon carbide abrasive paper. The residues from grinding, sanding, and polishing were removed by first rinsing the test coupons in an acetone bath and then treating the carbon steel test coupons for approximately five minutes in an ultrasonically agitated acetone bath. After cleaning, both the rectangular bar 20 and the carbon steel test coupons 102 were allowed to dry in air.

Figure 16:
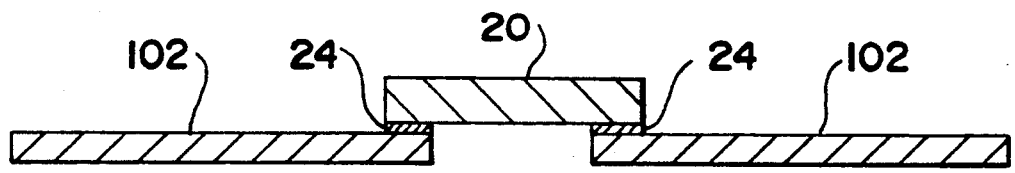
FIG. 16 is a schematic view of a portion of the lay-up for the brazing operation of Example 6.

A Cusin-1-ABA brazing alloy foil 24 (GTE Wesgo Division, Belmont, Calif.) measuring about 0.24 inch (6 mm) square by about 0.002 inch (0.050 mm) thick was placed near one end of each of the two (2) carbon steel test coupons 102, as shown in FIG. 16. The rectangular bar 20 was placed over the ends of the carbon steel test coupons 102 such that the brazing foils 24 were substantially completely covered, thus forming a lay-up for brazing.

Figure 15:
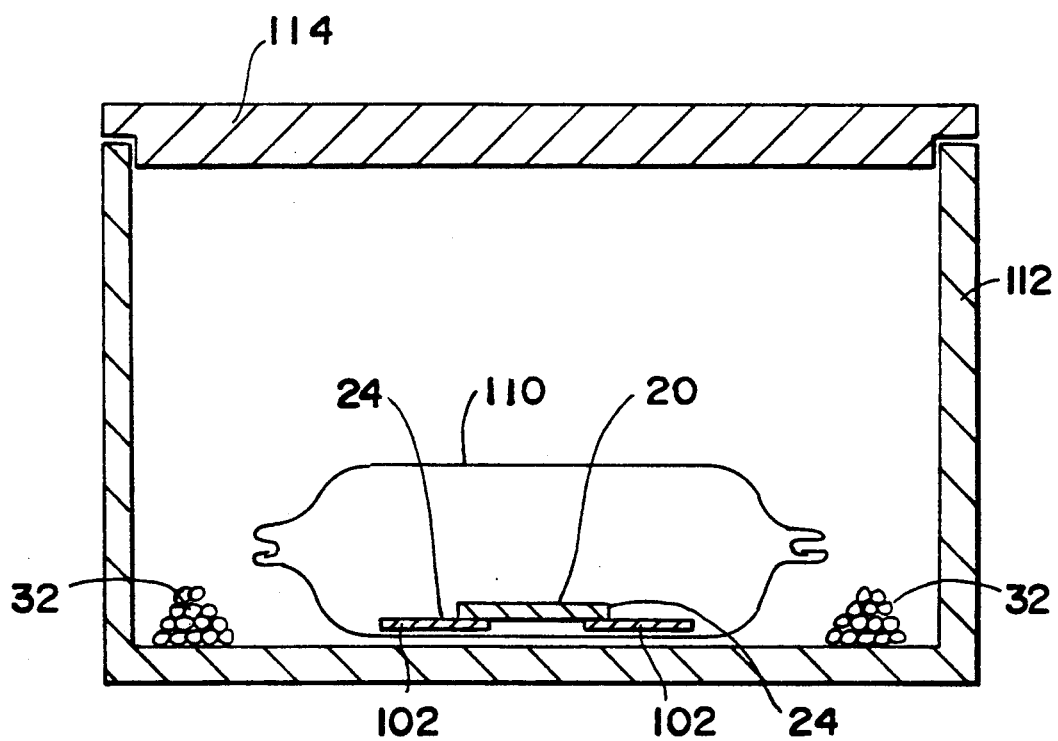
FIG. 15 is a schematic illustration of the setup employed in carrying out the brazing operation of Example 6.

The lay-up of FIG. 16, comprising the rectangular bar 20, the two (2) carbon steel test coupons 102, and the two (2) Cusin-1-ABA brazing foils 24, was placed between two layers of zirconium foil (Phoenix Metallurgical Corporation, Houston, Tex.), each layer comprising two sheets of zirconium foil measuring about 4.0 inches (102 mm) long by about 2.0 inches (51 mm) wide by about 0.0002 inch (0.050 mm) thick. As shown in FIG. 15, a pouch 11D was fabricated by hand folding and crimping the edges of the two (2) zirconium foil layers together to form a seam. The formed seam was not air-tight. The zirconium foil pouch 110 was used to isolate the lay-up from residual oxidizing gases in the furnace atmosphere by gettering any such gases. The zirconium foil pouch 110 and its contents were then placed into a Grade ATJ graphite boat 112 (Union Carbide Company, Carbon Products Division, Cleveland, Ohio) measuring about 6 inches (152 mm) square, by about 4.0 inches (102 mm) tall and having a loose fitting graphite lid 114 to cover the open end of the boat 112. About 100 grams of nuclear grade zirconium sponge 32 (Western Zirconium, Ogden, Utah) were placed at opposite ends of the graphite boat 112 to assist in keeping the local environment within the graphite boat 112 free of oxidizing gas contaminants.

The graphite boat 112 and its contents were placed into a vacuum furnace at about room temperature. The vacuum chamber was evacuated to a vacuum of about 30 inches (762 mm) of mercury using a mechanical roughing pump and then backfilled with argon gas. After pumping down the vacuum chamber a second time to a vacuum of about 30 inches (762 mm) of mercury, a high vacuum source was connected to the vacuum chamber and the chamber was pumped down to a final working pressure of less than about $2 \times 10^{-4}$ torr. The furnace temperature was then increased to about 750° C. at a rate of about 400° C. per hour. After maintaining a temperature of about 750° C. for about one hour, the source of high vacuum was isolated from the vacuum chamber and the vacuum chamber was backfilled with argon gas. An argon gas flow rate of about 0.5 liters per minute at an overpressure of about 2 psi (14 kPa) through the vacuum chamber was established. The remainder of the run was conducted under this flowing argon gas atmosphere. The furnace temperature was then increased from about 750° C. to about 850° C. at a rate of about 250° C. per hour. A temperature of about 850° C. was held for about 15 minutes, then the furnace temperature was decreased at a rate of about 350° C. per hour. After the furnace had cooled to about room temperature, the furnace was opened and the graphite boat 112 and its contents were removed from the vacuum chamber. The zirconium foil pouch 110 and its contents were removed from the graphite boat 112 and disassembled. It was determined that the carbon steel test coupons 102 had bonded to the rectangular bar 20.

Figure 17:
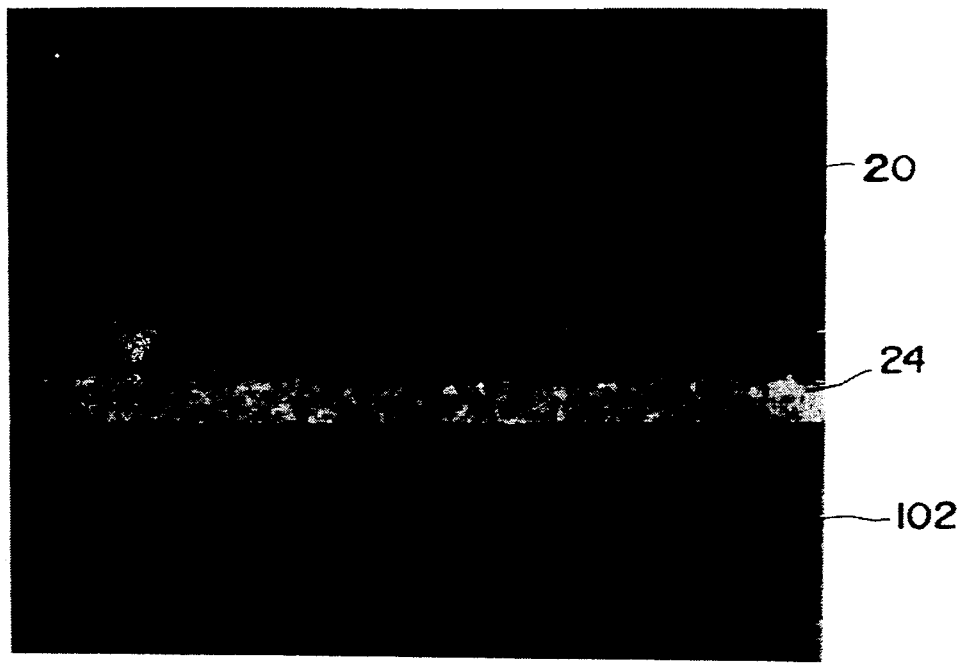
FIG. 17 is an approximately 100× magnification photomicrograph of a cross-section of the brazement formed in Example 6.

One of the bonded regions was sectioned, mounted, and diamond polished for examination in the optical microscope. An approximately 100× magnification photomicrograph of the cross-section of the bonded region is shown in FIG. 17. The photograph indicates that bonding was achieved between the rectangular bar 20 and the carbon steel test coupon 102 via a brazing process because the region between the two is substantially completely filled with the Cusin-1-ABA brazing alloy foil material 24 (GTE Wesgo Division, Belmont, Calif.). The brazing alloy foil material 24 thus appears to have melted, wet the two (2) surfaces of the platelet-reinforced composite bar 20 and the carbon steel test coupon 102, expelled the void space, and adhered to the two (2) surfaces to form a brazement.

EXAMPLE 7

This Example demonstrates a further embodiment of the process for joining a platelet-reinforced composite body to a steel body by a brazing operation. The setup used to carry out the brazing operation is substantially the same as that shown in FIG. 15.

A platelet-reinforced composite body was fabricated by substantially the same techniques as was employed in fabricating the platelet-reinforced body described in Example 2. A right rectangular bar 20 was electro-discharge machined from this platelet-reinforced composite body and then surface ground to a final dimension of about 1.0 inch (25 mm) in length, by about ¼ inch (6 mm) in width, by about ¼ inch (6 mm) in height. One of the approximately 1.0 inch (25 mm) by about ¼ inch (6 mm) faces was polished using a series of incrementally finer diamond polishing pastes, with the last paste in the series having diamond particles averaging about 1 micron in size. The rectangular bar 20 was then rinsed in acetone and cleaned ultrasonically in an acetone bath for about five minutes. Once face of the rectangular bar 20 was then additionally polished with approximately 1200 grit silicon carbide abrasive paper.

Two (2) carbon steel test coupons 102, each measuring about 2½ inches (63 mm) long, by about 1.0 inch (25 mm) wide, by about ⅛ inch (3 mm) thick, were prepared for brazing to the platelet-reinforced composite bar 20 by flat grinding the surfaces to be joined, smoothing the ground surfaces by abrading with 60 grit, 120 grit, and 180 grit, respectively, silicon carbide abrasive paper. The debris from grinding and sanding was removed by first rinsing the carbon steel test coupons 102 in an acetone bath and then giving the test coupons 102 an ultrasonic cleaning treatment in acetone for about five minutes. After drying the cleaned steel test coupons 102 in air, the two (2) faces to be brazed were polished with approximately 1200 grit silicon carbide abrasive paper.

Figure 18:
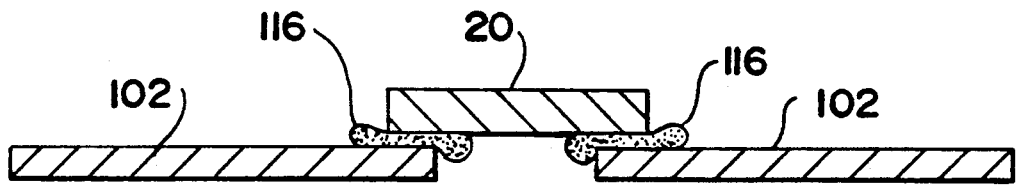
FIG. 18 is a schematic view of a portion of the lay-up for the brazing operation of Example 7.

The two (2) carbon steel test coupons 102 were arranged polished side up as shown in FIG. 18. About 0.09 grams of LUCANEX ™ 721 brazing alloy (comprising by weight about 66.5% silver, about 25.1% copper, and about 8.3% titanium) filler material 116 (Lucas-Milhaupt, Inc., Cudahy, Wis.) having the consistency of paste was placed onto each of the steel coupons 102 in the vicinity of the desired brazement. The rectangular bar 20 was then placed across the two (2) carbon steel test coupons 102 and so oriented such that its polished face contacted the brazing alloy filler material 116 on the carbon steel test coupons 102. The platelet-reinforced composite bar was pressed down onto the steel test coupons 102 to squeeze out excess brazing alloy filler material 116 from the joint. The excess brazing alloy filler material 116 was left on the steel test coupons 102. Thus, a lay-up for brazing was formed.

Similar to the lay-up for Example 6, shown in FIG. 15, a zirconium foil container 110 was fabricated around the lay-up for brazing. The zirconium foil container 110 was perforated at several locations along the sides to assist in maintaining the shape integrity of the foil container 110 during the various evacuation and backfilling operations. The zirconium foil container 110 was then placed inside a Grade ATJ graphite boat 112 (Union Carbide Corporation, Carbon Products Division, Cleveland, Ohio) measuring about 6.0 inches (152 mm)

square by about 4.0 inches (102 mm) tall. About 100 grams of nuclear grade zirconium sponge 32 (Western Zirconium, Ogden, Utah) were placed at opposite ends of the graphite boat 112 to assist in keeping the local environment within the graphite boat 112 free of oxidizing gas contaminants. A loose fitting Grade ATJ graphite lid 114 (Union Carbide Corporation, Carbon Products Division, Cleveland, Ohio) was placed over the open end of the graphite boat 112.

The graphite boat 112 and its contents were placed into the vacuum chamber of a vacuum furnace at about room temperature. The vacuum chamber was evacuated to a vacuum of about 30.0 inches (762 mm) of mercury using a mechanical roughing pump and then backfilled with argon gas to about atmospheric pressure. After pumping down the vacuum chamber a second time to a vacuum of about 30.0 inches (762 mm) of mercury with the roughing pump, a high vacuum source was connected to the vacuum chamber and the chamber was pumped down further to a final operating pressure of less than about $2 \times 10^{-4}$ torr. The furnace temperature was then increased to a temperature of about 750° C. at a rate of about 400° C. per hour. After maintaining a temperature of about 750° C. for about one hour, the high vacuum source was isolated from the vacuum chamber and the chamber was backfilled with argon gas to an overpressure of about 2 psi (14 kPa). An argon gas flow rate of about 0.5 liters per minute was established through the chamber. The remainder of the run was conducted under this flowing argon gas atmosphere. The furnace temperature was then increased from about 750° C. to about 912° C. at a rate of about 250° C. per hour. After maintaining a temperature of about 912° C. for about 15 minutes, the temperature was then decreased at a rate of about 350° C. per hour. After the furnace had cooled to about room temperature, the furnace was opened and the graphite boat 112 and its contents were removed from the vacuum chamber. The zirconium foil container 110 was disassembled and the lay-up was removed to reveal that the rectangular bar 20 had bonded to the two (2) carbon steel test coupons 102.

Figure 19:
FIG. 19 is an approximately 100× magnification photomicrograph of a cross-section of the brazement formed in Example 7.

One (1) of the two (2) brazed regions was sectioned, mounted, and diamond polished for examination in the optical microscope. An approximately 100× magnification photomicrograph of the cross-section of this brazed region is shown in FIG. 19. The photomicrograph indicates that bonding was achieved between the rectangular bar 20 and the carbon steel test coupon 102 with the brazing material 116.

Thus, a further embodiment of the process for joining a platelet-reinforced composite body to a steel body by a brazing operation was demonstrated.

EXAMPLE 8

This Example demonstrates yet another embodiment of the process for joining a platelet-reinforced composite body to a carbon steel body by means of a brazing operation.

A platelet-reinforced composite body was fabricated by substantially the same method as was described in Example 1. The lay-up used in carrying out the fabrication of the platelet-reinforced composite body was substantially the same as that illustrated in FIG. 1.

The lay-up employed in joining the platelet-reinforced composite bars 20 to the steel backing plate 22 was substantially the same as that described in Example 1 and illustrated in FIG. 2. The differences in the brazing operation between the present Example and that of Example 1 are described herein.

Specifically, four (4) platelet-reinforced composite bars 20 were machined, ground, polished, and cleaned in substantially the same manner as were the bars discussed in Examples 1 and 4. Similarly, the steel backing plate 22 to be joined to the platelet-reinforced composite bars 20 was ground and cleaned in substantially the same manner as was the steel backing plate described in Examples 1 and 4. This steel backing plate 22 was also of substantially the same composition as the steel backing plate Examples 1 and 4 steel backing plates, comprising by weight about 0.38–0.43% C, about 0.60–0.80% Mn, ≦0.040% P, ≦0.040% S, about 0.20–0.75% Si, about 1.65–2.00% Ni, about 0.20–0.30% Mo, and the balance Fe (nominally American Iron and Steel Institute Alloy No. 4640).

The lay-up for brazing was placed into the vacuum chamber of a vacuum furnace at about room temperature. The vacuum chamber was evacuated to a vacuum of about 30.0 inches (762 mm) of mercury using a mechanical roughing pump and then backfilled with argon gas to about atmospheric pressure. The vacuum chamber was then evacuated a second time using the roughing pump to a vacuum of about 30.0 inches (762 mm) of mercury, at which point a source of high vacuum was connected to the vacuum chamber and the chamber was evacuated to a final operating pressure of less than about $2 \times 10^{-4}$ torr. The furnace temperature was then increased to about 750° C. at a rate of about 400° C. per hour. After maintaining a temperature of about 750° C. for about one hour, the furnace temperature was increased to a temperature of about 900° C. at a rate of about 250° C. per hour. A temperature of about 900° C. was maintained for about 15 minutes, and the temperature was decreased at a rate of about 350° C. per hour. After the furnace had cooled to about room temperature, the vacuum chamber pressure was increased to atmospheric pressure, the furnace was opened, and the lay-up was removed from the vacuum chamber. Inspection of the lay-up revealed that the four (4) reinforced composite bars 20 were joined to the steel backing plate 22.

Figure 20:
FIG. 20 is an approximately 100× magnification photomicrograph of a cross-section of the brazement formed in Example 8.

One (1) of the four (4) brazed platelet-reinforced composite bars was sectioned through the brazement and that section was mounted and polished for examination in the optical microscope. An approximately 100× magnification photomicrograph of the cross-section of a region between the platelet-reinforced composite material 20 and the steel backing plate 22 where the bonding appeared to be continuous is shown in FIG. 20. This particular cross-section shows that the region between the platelet-reinforced composite material 20 and the steel 22 is substantially completely filled with the brazing alloy filler material 116.

EXAMPLE 9

This Example demonstrates yet another embodiment of the technique of joining a platelet-reinforced composite body to a carbon steel body by means of a brazing operation. The fabrication of the platelet-reinforced composite bars was substantially the same as that described in Example 1 and as illustrated in FIG. 5. The procedures employed in machining, grinding, polishing, and cleaning the platelet-reinforced composite bars was substantially the same as those described in Examples 1 and 4. The preparation of the steel backing plate for brazing was also substantially the same as that described in Examples 1 and 4. The procedure employed in brazing the platelet-reinforced composite bars to the steel backing plate was similar to that described in Example 4 and as illustrated in FIG. 10 with the following differences described herein.

The lay-up was placed into the vacuum chamber of a vacuum furnace at about room temperature. The vacuum chamber was evacuated to a vacuum of about 30.0 inches (762 mm) of mercury by means of a mechanical roughing pump. The chamber was then backfilled with argon gas to about atmospheric pressure. The vacuum chamber was evacuated a second time by means of the roughing pump to a vacuum of about 30.0 inches (762 mm) of mercury and was then connected to a source of high vacuum to evacuate the vacuum chamber to a final working pressure of less than about $2 \times 10^{-4}$ torr. The furnace temperature was then increased to a temperature of about 500° C. at a rate of about 250° C. per hour. At a temperature of about 500° C., the source of high vacuum was isolated from the vacuum chamber and the chamber was backfilled with argon gas to an overpressure of about 2 psi (14 kPa). An argon gas flow rate of about two liters per minute through the vacuum chamber was established. The remainder of the brazing operation was conducted under this flowing argon gas atmosphere. The furnace was then increased from about 500° C. to a temperature of about 850° C. at a rate of about 500° C. per hour. After maintaining a temperature of about 850° C. for about 15 minutes, the furnace temperature was then decreased to a temperature of about 800° C. at a rate of about 300° C. per hour. At a temperature of about 800° C., the furnace temperature was then further decreased to a temperature of about 400° C. at a rate of about 120° C. per hour. At a temperature of about 400° C., the furnace temperature was then further decreased at a rate of about 300° C. per hour. When the furnace had cooled to about room temperature, the vacuum chamber was opened and the lay-up was removed. Inspection of the steel and platelet-reinforced composite assembly revealed that the four (4) rectangular bars of the platelet-reinforced composite material were joined to the steel backing plate.

To set a lower bound on the strength of the joints between the platelet-reinforced composite bars and the steel backing plate, a proof test was conducted. Specifically, the proof test comprised applying a compressive shear load to the joint in substantially the same manner as was described in Example 1. Instead of loading the joint to failure, however, the joint was loaded up to a force corresponding to a shear stress of about 2000 psi (13.8 MPa). As soon as the proof stress of about 2000 psi (13.8 MPa) was reached, the load was immediately removed. Each of the other three (3) joints was similarly tested. The brazed assembly maintained its structural and dimensional integrity.

This Example thus demonstrates yet another embodiment of a process for joining a platelet-reinforced composite body to a steel body by means of a brazing operation. Additionally, a proof test of the brazements is described.

EXAMPLE 10

Figure 21:
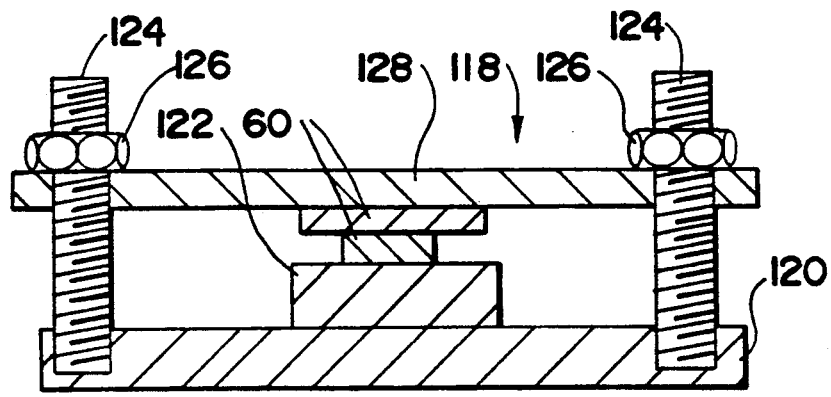
FIG. 21 is a schematic illustration of setup employed in carrying out the joining operation of Example 10.

In a manner similar to Example 2, this Example presents a further embodiment of the concept of joining two (2) platelet-reinforced composite bodies through application of heat and pressure, wherein the platelet-reinforced composite bodies contain a relatively low amount of residual metal. The setup used to accomplish the joining operation is shown in FIG. 21. The lay-up used to fabricate the platelet-reinforced composite bodies to be joined to one another is substantially the same as that shown in FIG. 5.

A platelet-reinforced composite body was fabricated in substantially the same manner as the platelet-reinforced composite body fabricated in Example 2, with three exceptions. First, the graphite mold 52 comprised Grade ATJ graphite (Union Carbide Corporation, Carbon Products Division, Cleveland, Ohio) and measured about 3.0 inches (76 mm) square and about 3½ inches (89 mm) deep as measured in its interior. Second, after drying and firing, the mass of the sediment cast preform 50 was found to be about 134 grams and its thickness about 0.75 inch (19 mm). The bulk density of the sediment cast preform 50 was determined to be about 1.21 grams per cubic centimeter or about 48% of the theoretical density of boron carbide. Third, about 854 grams of zirconium sponge 54 (Consolidated Astronautics, Saddlebrook, N.J.) was placed into the Grade ATJ mold 52 (Union Carbide Corporation, Carbon Products Division, Cleveland, Ohio) over the sediment cast boron carbide preform 50 and levelled to form a lay-up.

After heating the lay-up in substantially the same manner as was described in Example 2, the lay-up was removed from the furnace and the contents of the graphite mold 52 were removed from the mold to reveal that the zirconium metal 54 had infiltrated and reacted with the sediment cast boron carbide preform 50 to produce a platelet-reinforced composite body comprising zirconium diboride, zirconium carbide, and some residual metal.

A representative polished sample of the formed platelet-reinforced composite body was prepared in substantially the same manner as was described in Example 2. Quantitative image analysis on the polished sample was performed in substantially the same manner as was described in Example 6, revealing the presence of about 3.4 volume percent residual metal in the platelet-reinforced composite.

Test coupons 60 of the platelet-reinforced composite body were electro-discharge machined from the 3.0 inches (76 mm) square platelet-reinforced composite body described above. Each coupon 60 measured about 0.75 inch (19 mm) long by about 0.336 inch (8.5 mm) wide by about 0.124 inch (3.1 mm) thick. The machined test coupons 60 were oriented in such a way that the approximately 0.75 inch (19 mm) by about 0.336 inch (8.5 mm) face of each test coupon 60 was contacted with that of the other coupon 60. The orientation was such that the long dimension of each coupon 60 was at an approximate right angle to that of the other coupon 60. The area of contact amounted to about 0.11 square inch (73 square mm).

The crossed test coupons were placed into the graphite jig 118, as shown in FIG. 21. The graphite jig 118 comprised a Grade ATJ graphite base 120 (Union Carbide Corporation, Carbon Products Division, Cleveland, Ohio), a Grade ATJ graphite pedestal 122 (Union Carbide Corporation, Cleveland, Ohio), graphite bolts 124 (Poco Graphite, Inc., Decatur, Tex.), graphite nuts 126 (Poco Graphite, Inc., Decatur, Tex.), and a Grade DFP-1 graphite crosshead 128 (Poco Graphite, Inc., Decatur, Tex.). The graphite jig 118 and the test coupons 60 to be joined to one another were then placed into the vacuum chamber of a vacuum furnace. The graphite nuts 126 at each end of the graphite crosshead 128 were tightened until the loading on the test coupons amounted to about 16.9 pounds (75 Newtons) which converted to a normal stress of about 150 psi (1.04 MPa). The vacuum chamber was sealed and then evacuated to a vacuum of about 30.0 inches (762 mm) of mercury and then backfilled with argon gas. An argon gas flow rate of about two liters per minute was established through the vacuum chamber at an overpressure of about 2 psi (14 kPa). The furnace temperature was then increased from about room temperature to a temperature of about 1800° C. at a rate of about 400° C. per hour. After maintaining a temperature of about 1800° C. for about one half hour, the furnace temperature was decreased at a rate of about 350° C. per hour. After the furnace temperature had decreased to substantially room temperature, the graphite jig 118 and test coupons 60 mounted within the jig were removed from the furnace. The two (2) platelet-reinforced composite test coupons 60 were removed from the graphite jig 118 and inspected. The two (2) test coupons 60 could not be separated from one another using hand pressure.

Figure 22:
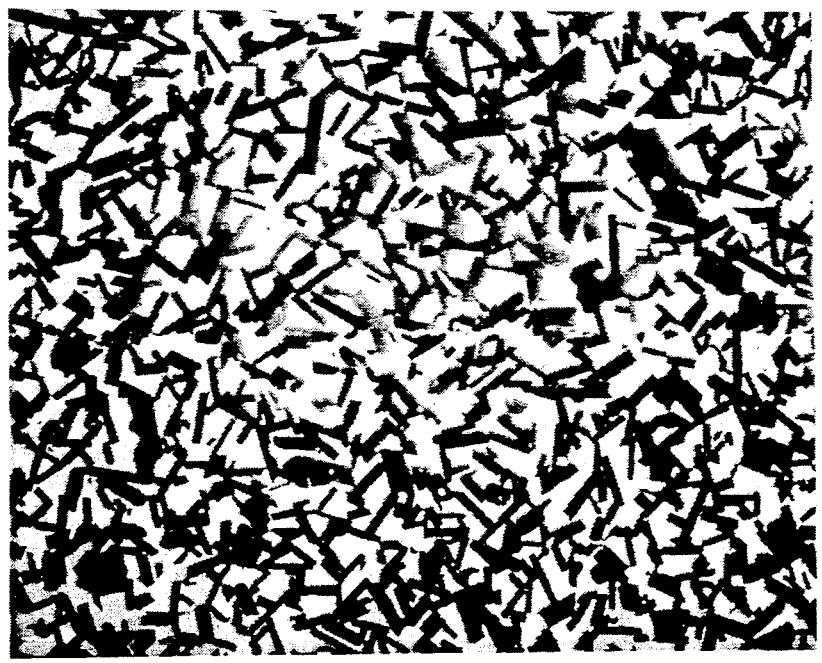
FIG. 22 is an approximately 200× magnification photomicrograph of a cross-section of the joined bodies of Example 10.

The joined platelet-reinforced composite test coupons 60 were sectioned using electro-discharge machining. The cut section was then mounted and polished with diamond paste for examination in a Model 500 PSEM scanning electron microscope (Philips, N.V., Eindhoven, The Netherlands) employing backscattered electron imaging. An approximately 200× magnification photomicrograph of the joint region is shown in FIG. 22. As in the case of the joint region shown in FIG. 7, the joint region shown in FIG. 22 (marked by the X's) similarly shows that the former boundary between the coupons 60, is substantially indistinguishable.

This Example therefore illustrates that platelet-reinforced composite bodies containing residual metal can be joined to one another by heating the bodies and contacting the surfaces of the bodies under pressure.

EXAMPLE 11

This Example demonstrates yet another embodiment of the technique for joining two (2) platelet-reinforced composite to one another by heating the bodies and contacting the surfaces under a slight pressure. The setup used for carrying out this bonding is shown schematically in FIG. 23.

About 300 grams of methylene chloride were placed into an approximately 1½ gallon (1.9 liter) plastic jug. About 2.0 grams of XUS 40303.00 Experimental Binder (Dow Chemical Company, Midland, Mich.) was dissolved into the methylene chloride to form a binder solution. About 200 grams of 1000 grit TETRABOR ® boron carbide particulate (ESK Engineered Ceramics, New Canaan, Conn.) having an average particle size of about 5 microns was then stirred into the binder solution in the plastic jar to form a slurry. The slurry was roll-mixed for about 1½ hours to thoroughly disperse the slurry constituents.

Referring to FIG. 5, a Grade AGSX graphite mold 52 (Union Carbide Corporation, Carbon Products Division, Cleveland, Ohio) measuring about 3.0 inches (76 mm) square by about 3½ inches (89 mm) tall in its interior was soaked for about one hour in methylene chloride to saturate the graphite with the solvent. After the soaking operation, some of the boron carbide slurry was sediment cast into the soaked graphite mold 52. Specifically, a sediment cast preform 50 was fabricated by pouring the slurry into the mold 52 and allowing the boron carbide particulate to settle out of the slurry and form a dense packed bed. During the sedimentation process, the graphite mold 52 and its contents were placed into a vacuum chamber which was evacuated to a vacuum of between 20.0 and 30.0 inches (508 and 762 mm) of mercury using a mechanical roughing pump, in order to minimize the amount of trapped air in the sediment. The bulk residual binder solution was removed by blotting off excess liquid from the top surface of the sediment cast preform 50 in the graphite mold 52. The graphite mold 52 containing the sediment cast preform 50 was then placed into the tapping chamber of a Model 2003 STAV Stampfvolumeter tap volume meter (J. Englesmann, A.G., Federal Republic of Germany) and tapped about 150 times to further consolidate the boron carbide particles. The graphite mold 52 containing the sediment cast preform 50 was then placed into a drying box at room temperature to remove the residual methylene chloride solvent in a slow and controlled manner so as to avoid rupturing the sediment cast preform 50. After drying in a drying box for about 24 hours, the graphite mold 52 containing the sediment cast preform 50 was transferred to a drying oven at a temperature of about 125° C. After drying at a temperature of about 125° C. for about 16 hours, the graphite crucible and its contents was then placed back into the tap volume meter and tapped about 150 more times.

The graphite mold 52 and the sediment cast preform 50 were fired to remove substantially all of the binder from the preform 50. Specifically, the graphite mold 52 containing the dried sediment cast preform 50 was then placed into the vacuum chamber of a furnace. The furnace chamber was evacuated to a vacuum of about 30.0 inches (762 mm) of mercury and backfilled with argon gas. An argon gas flow rate of about two liters per minute through the vacuum chamber at an overpressure of about 2 psi (14 kPa) was established. The furnace temperature was then raised from about room temperature to a temperature of about 200° C. at a rate of about 100° C. per hour. The temperature was then increased from about 200° C. to about 350° C. at a rate of about 20° C. per hour. The temperature was then increased from about 350° C. to about 600° C. at a rate of about 50° C. per hour. Upon reaching a temperature of about 600° C., power to the heating elements of the furnace was interrupted and the furnace was allowed to cool to a temperature of about 50° C. At a temperature of about 50° C., the graphite mold 52 and its sediment cast preform 50 contained within was removed from the furnace. The sediment cast preform 50 was determined to have a mass of about 279 grams and dimensions of about 3.0 inches (76 mm) square by about 1¾ inches (45 mm) thick. The bulk density of the sediment cast boron carbide preform 50 was calculated to be about 1.07 grams per cubic centimeter or about 42.5% of the theoretical density of boron carbide.

About 1889 grams of nuclear grade zirconium sponge 54 (Western Zirconium, Ogden, Utah) was placed into the graphite mold 52 over the sediment cast preform 50 of boron carbide particulate and levelled to form a lay-up. The formed lay-up was placed back into the vacuum chamber of the vacuum furnace. The chamber was sealed, evacuated to a vacuum of about 30.0 inches (762 mm) of mercury using a mechanical roughing pump, and then backfilled with argon gas. After evacuating the vacuum chamber a second time to a vacuum of about 30.0 inches (762 mm) of mercury using the roughing pump, power to the heating elements was applied and the furnace temperature was increased from about room temperature to a temperature of about 1900° C. at a rate of about 238° C. per hour. Upon reaching a temperature of about 1000° C., the vacuum chamber was backfilled with argon gas. An argon gas flow rate through the vacuum chamber of about two liters per minute at an overpressure of about 2 psi (14 kPa) was established. The remainder of the furnace run was conducted under this flowing argon gas atmosphere. After maintaining a temperature of about 1900° C. for about two hours, the furnace temperature was decreased at a rate of about 238° C. per hour. When the furnace temperature had reached about room temperature, the vacuum chamber pressure was reduced to atmospheric pressure and the lay-up was removed from the vacuum chamber. The contents of the graphite mold 52 were removed from the mold to reveal that the zirconium metal 54 had infiltrated and reacted with at least a portion of the sediment cast boron carbide preform 50 to produce a platelet-reinforced composite body comprising zirconium diboride, zirconium carbide, and some residual metal. An approximately 0.45 inch (11 mm) thick layer of particulate boron carbide preform material 50 located substantially at the bottom of the preform relative to the zirconium metal 54 remained uninfiltrated.

A section of the formed platelet-reinforced composite body was removed using electro-discharge machining. The machined section was mounted in plastic and polished with diamond polishing paste for subsequent examination in the optical microscope. Quantitative image analysis of several polished sections, as described in detail in Example 4, revealed the presence of about 34 volume percent residual metal in the composite.

Figure 23:
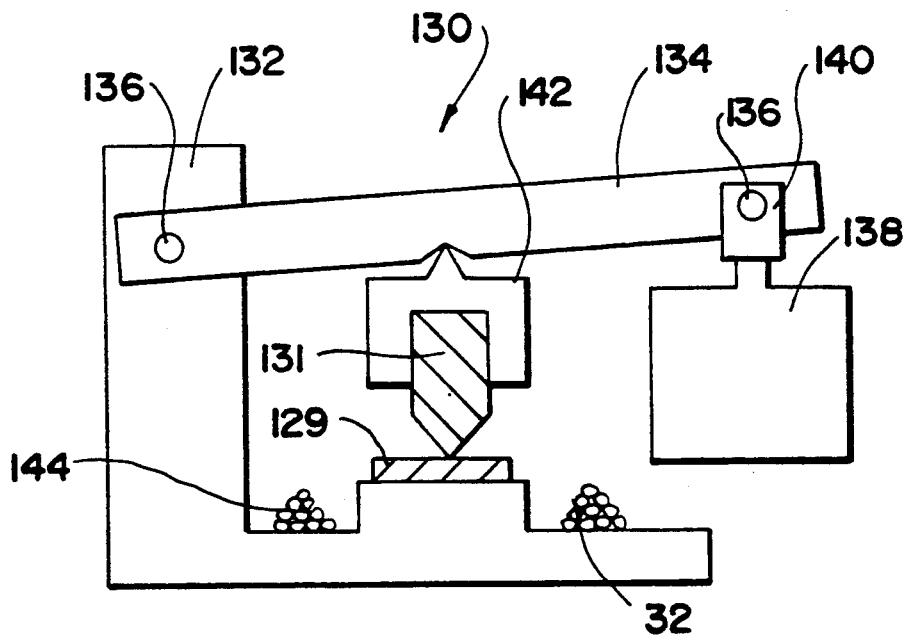
FIG. 23 is a schematic illustration of the setup employed in carrying out the joining operation of Example 11.

Two (2) shaped coupons were also electro-discharge machined from the formed platelet-reinforced composite body and are shown in cross-section in FIG. 23. Specifically, one (1) shaped coupon 129 was in the form of disc, measuring about 0.985 inch (25 mm) in diameter by about 0.125 inch (3 mm) thick, while the other shaped coupon 131 substantially resembled an anvil measuring about ½ inch (13 mm) in diameter by about 1.0 inch (25 mm) in overall height. The electro-discharge machined coupons were cleaned in an acetone bath.

The machined and cleaned test coupons 129 and 131 were placed into the jig 130 illustrated in FIG. 23. Specifically, the graphite jig 130 illustrated in FIG. 23 comprised a Grade ATJ graphite base and vertical section 132 (Union Carbide Corporation, Carbon Products Division, Cleveland, Ohio), a graphite cantilever beam 134 (Poco Graphite, Inc., Decatur, Tex.), graphite fulcrum pins 136 (Poco Graphite, Inc., Decatur, Tex.), a mass 138 comprising a platelet reinforced composite body, a graphite means 140 (Poco Graphite, Inc., Decatur, Tex.) for connecting said mass 138 to said cantilever beam 134, and a Grade ATJ graphite platen 142 (Union Carbide Corporation, Carbon Products Division, Cleveland, Ohio). A mass 138 of about 2.2 kilograms was suspended from the end of the cantilever beam 134 component of the jig 130 to produce a compressive stress of about 150 psi (1.04 MPa) over the ½ inch (13 mm) diameter of the anvil shaped coupon body 131. The compressive stress near the tip of the coupon 31 was, of course, much greater; therefore, the applied stress of about 150 psi (1.04 MPa) represented the minimum applied compressive stress.

Figure 24:
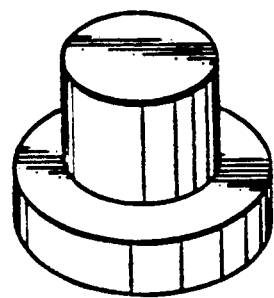
FIG. 24 is a photograph of the platelet reinforced composite body joined according to the techniques of Example 11.

The jig 130 and its contained test pieces was then placed into the vacuum chamber of a vacuum furnace. About 100 grams each of zirconium sponge 32 (Western Zirconium, Ogden, Utah) and hafnium sponge 144 (Teledyne Wah Chang Albany, Albany, Oreg.) were distributed evenly around the base 132 of the jig 130 to serve as gaseous "getters" to assist in maintaining an essentially non-reactive atmosphere in the vacuum chamber during the furnace run. The vacuum chamber was sealed and evacuated to a vacuum of about 30.0 inches (762 mm) of mercury and then backfilled with argon gas. After re-evacuating the vacuum chamber a second time using the mechanical roughing pump, a high vacuum source was connected to said vacuum chamber to further evacuate said chamber to a final operating pressure of less than about $2 \times 10^{-4}$ torr. The furnace temperature was then increased from about room temperature to a temperature of about 1800° C. at a rate of about 400° C. per hour. At a temperature of about 1000° C., the high vacuum source was isolated from the vacuum chamber and the chamber vacuum was maintained for the duration of the furnace run using only the mechanical roughing pump as the vacuum source. After maintaining a temperature of about 1800° C. for about one half hour, the furnace temperature was decreased at a rate of about 350° C. per hour. After the furnace temperature had decreased to about room temperature, the vacuum chamber pressure was increased to atmospheric pressure and the jig 130 and its contents were removed from the vacuum chamber and machined to remove tarnish and burrs. As shown in FIG. 24, the heat and applied pressure had the effect of bonding the platelet reinforced composite bodies into a single mass. The former boundary between the bodies could be distinguished visually.

This Example illustrates that platelet reinforced composite bodies containing residual metal can be joined to one another by heating said bodies and contacting the surfaces of the bodies under a modest pressure.

What is claimed is:

1. A method for producing a self-supporting body, comprising:

providing at least one self-supporting body which is made by a process comprising (i) heating a parent metal in a substantially inert atmosphere to a temperature above its melting point to form a body of molten parent metal; (ii) contacting said body of molten parent metal with a permeable mass which is to be reactively infiltrated; (iii) maintaining said temperature for a time sufficient to permit infiltration of molten parent metal into said permeable mass which is to be reactively infiltrated and to permit reaction of said molten parent metal with said permeable mass to form at least one boron-containing compound; (iv) continuing said infiltration reaction for a time sufficient to produce said at least one first self-supporting body;

providing a brazing material on at least a portion of a surface of said at least one first self-supporting body;

contacting said brazing material with at least a portion of a surface of at least one second self-supporting body;

heating said at least one first self-supporting body, said brazing material and said at least one second self-supporting body to a temperature which permits said brazing material to bond said at least one first self-supporting body and said at least one second self-supporting body together.

2. The method of claim 1, wherein the composition of said at least one first self-supporting body is substantially identical to the composition of said at least one second self-supporting body.

3. The method of claim 1, wherein said at least one first self-supporting body has a composition which is different from the composition of said at least one second self-supporting body.

4. The method of claim 1, wherein said parent metal comprises at least one metal selected from the group consisting of zirconium, titanium and hafnium.

5. The method of claim 1, wherein said permeable mass which is to be reactively infiltrated comprises at least one material selected from the group consisting of a carbon source material, a boron source material and a nitrogen source material.

6. The method of claim 1, wherein said at least one first self-supporting body further comprises an inert filler material.

7. The method of claim 1, wherein said brazing material comprises at least one material selected from the group consisting of foils, rods, plates, pastes and powders.

8. The method of claim 1, wherein said brazing material comprises at least two foils.

9. The method of claim 8, wherein said at least two foils are substantially the same in composition.

10. The method of claim 8, wherein said at least two foils are different in composition from each other.

11. The method of claim 1, further comprising providing a protective envelope to said at least one first self-supporting body, said at least one second self-supporting body and said brazing material to enhance the bonding of said at least one first self-supporting body to said at least one second self-supporting body.

12. The method of claim 11, wherein said protective envelope comprises a metal foil.

13. The method of claim 1, wherein said brazing material comprises at least one metal.

14. The method of claim 7, wherein said brazing material comprises at least one material selected from the group consisting of metal foils and metal pastes.

15. The method of claim 14, wherein said brazing material comprises at least one copper foil sandwiched between at least two metal foils comprising about 63% silver, about 34.25% copper, about 1.75% titanium and about 1% tin.

16. The method of claim 13, wherein said brazing material comprises titanium.

17. The method of claim 14, wherein said brazing material comprises a metal paste comprising by weight about 66.5% silver, about 25.1% copper and about 8.3% titanium.

* * * * *